US011443396B2

(12) United States Patent
Morris

(10) Patent No.: US 11,443,396 B2
(45) Date of Patent: Sep. 13, 2022

(54) SYSTEMS AND METHODS FOR PRIORITIZING TRAILERS AT RECEIVING FACILITY

(71) Applicant: Walmart Apollo, LLC, Bentonville, AR (US)

(72) Inventor: Jordon Morris, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/799,165

(22) Filed: Feb. 24, 2020

(65) Prior Publication Data

US 2020/0273133 A1 Aug. 27, 2020

Related U.S. Application Data

(60) Provisional application No. 62/809,878, filed on Feb. 25, 2019, provisional application No. 62/809,887, filed on Feb. 25, 2019, provisional application No. 62/809,890, filed on Feb. 25, 2019.

(51) Int. Cl.
   *G06Q 50/28* (2012.01)
   *G06F 16/27* (2019.01)
   *G06Q 10/06* (2012.01)

(52) U.S. Cl.
   CPC ............ *G06Q 50/28* (2013.01); *G06F 16/27* (2019.01); *G06Q 10/06315* (2013.01); *G06Q 10/06316* (2013.01)

(58) Field of Classification Search
   CPC ............ G06Q 50/28; G06Q 10/06315; G06Q 10/06316; G06F 16/27
   See application file for complete search history.

(56) References Cited

U.S. PATENT DOCUMENTS 7,633,379 B2   12/2009  Jenney et al.
8,417,550 B2    4/2013  Gabrielson
(Continued)

FOREIGN PATENT DOCUMENTS

CN       109945919      *    2/2019

OTHER PUBLICATIONS

Cox, David Alan, and Manuel D. Rossetti. "Simulation modeling of alternative staffing and task prioritization in manual post-distribution cross docking facilities." 2017 Winter Simulation Conference (WSC). IEEE, 2017. (Year: 2017).*

(Continued)

*Primary Examiner* — Crystol Stewart
*Assistant Examiner* — Hamzeh Obaid

(57) ABSTRACT

A system for prioritizing trailers delivering retail goods for an available receiving facility comprises a control unit that assigning a trailer from the plurality of trailers to be received by an available loading dock in response to data received by the control unit regarding a determined event requiring the retail goods in the trailer; and a plurality of sensors that receive and process information regarding the event and output the information as the data to the control unit. The control unit includes an allocation engine that identifies a match between the trailer and the available loading dock and prioritizes the trailer over other trailers of the plurality of trailers for receipt by the available loading dock according to the determined event.

16 Claims, 13 Drawing Sheets

(56) References Cited

U.S. PATENT DOCUMENTS

| | | | |
|---|---|---|---|
| 8,627,529 B1* | 1/2014 | Palmersheim | B65G 69/2817 14/71.3 |
| 8,855,806 B2 | 10/2014 | Hara et al. | |
| 10,494,205 B1* | 12/2019 | Hoofard | H04L 9/3231 |
| 10,926,953 B2* | 2/2021 | Grabbe | G05D 1/0291 |
| 2011/0225023 A1 | 9/2011 | Evens et al. | |
| 2016/0350701 A1* | 12/2016 | Brehm | G05D 1/0297 |
| 2017/0132551 A1 | 5/2017 | Shields et al. | |
| 2017/0323412 A1* | 11/2017 | Muirhead | G06K 19/0723 |
| 2018/0060810 A1* | 3/2018 | Seaman | G06Q 10/0833 |
| 2018/0121864 A1* | 5/2018 | Sullivan | G06Q 10/06316 |
| 2018/0293527 A1* | 10/2018 | Amirjalayer | G06Q 10/087 |
| 2018/0363358 A1* | 12/2018 | Hudson | E01F 13/048 |
| 2019/0064835 A1* | 2/2019 | Hoofard | B60W 30/00 |
| 2019/0066033 A1* | 2/2019 | Mains, Jr. | G06Q 10/06311 |

OTHER PUBLICATIONS

Santa, José, et al. "Telematic platform for integral management of agricultural/perishable goods in terrestrial logistics." Computers and Electronics in Agriculture 80 (2012): 31-40. (Year: 2012).*

"Doing More with Less: Yard and Dock Management Systems From an ROI Perspective," White Paper, 2015, 4Sight, ASSA ABLOY Entrance Systems AB, https://4sightsolution.com/news/4sight-white-paper-addresses-roi-potential-for-integrated-yard-and-dock-management-systems/.

"Blockchain & Trucking: the Promise and Potential," UPNext, 2018, Navistar, inc., https://upnexttrucking.com/blockchain/point-of-view/blockchain-trucking-potential.

Choe, et al. "The future of freight: How new technology and new thinking can transform how goods are moved," Jun. 28, 2017, Deloitte, https://www2.deloitte.com/us/en/insights/focus/future-of-mobility/future-of-freight-simplifying-last-mile-logistics.html#.

* cited by examiner

SYSTEMS AND METHODS FOR PRIORITIZING TRAILERS AT RECEIVING FACILITY

CROSS REFERENCE TO RELATED APPLICATION

This application claims priority to U.S. Provisional Patent Application Ser. No. 62/809,878, entitled "System and Method for Prioritizing Trailers at Receiving Facility" and filed Feb. 25, 2019, U.S. Provisional Patent Application Ser. No. 62/809,887, entitled "Delivering Retail Products Using Distributed Ledger System" and filed Feb. 25, 2019, and U.S. Provisional Patent Application Ser. No. 62/809,890, entitled "System and Method for Prioritizing Trailers at Receiving Facility" and filed Feb. 25, 2019, the contents of each of which is hereby incorporated entirely herein by reference.

TECHNICAL FIELD

This application is related generally to the loading and unloading of contents of a trailer at a receiving facility having a smaller number of loading docks than a number of trailers for unloading cargo at the receiving facility, and more specifically, to methods, systems, and computer program products for prioritizing the trailers at the receiving facility.

BACKGROUND

Modern commerce relies on the use of trucks, trailers, and/or other vehicles to deliver their cargo to distribution centers, warehouses, or other store locations having one or more loading docks where the vehicles' cargo can be loaded or unloaded. Although scheduling systems are available for anticipating the arrival of delivery vehicles, events may arise that prevent the unloading of goods from trucks at the receiving location, for example, the lack of availability of a loading dock, inventory problems, unexpected problems at the distribution center. Other events may expedite the need to unload goods from a particular trailer, for example, an inaccurate replenishment forecast, an emergency, or time sensitivity with regard to freshness of perishable goods in a particular trailer. Such events may result in an insufficient number of loading docks to accommodate the delivery vehicles currently waiting to unload their contents. Delivery vehicles and their trailers typically attend any available loading dock on a static first-in/first-out (FIFO) basis without any consideration to factors, unexpected events, or the like. Therefore, bottlenecks may occur at a loading dock. Further, delivery vehicles and their trailers typically attend any available loading dock on a static first-in/first-out (FIFO) basis, without any consideration to factors, unexpected events, or demurrage charges.

BRIEF SUMMARY

In one aspect, a system for prioritizing trailers delivering retail goods for an available receiving facility comprises a control unit that assigning a trailer from the plurality of trailers to be received by an available loading dock in response to data received by the control unit regarding a determined event requiring the retail goods in the trailer; and a plurality of sensors that receive and process information regarding the event and output the information as the data to the control unit, wherein the control unit includes an allocation engine that identifies a match between the trailer and the available loading dock and prioritizes the trailer over other trailers of the plurality of trailers for receipt by the available loading dock according to the determined event.

In another aspect, a method for prioritizing trailers attached to vehicles for unloading items from the trailer at a distribution center comprises assigning a trailer from the plurality of trailers to be received by an available loading dock in response to data received by the control unit regarding a determined event requiring the retail goods in the trailer; collecting information regarding the event and outputting the information as the data to the control unit; and processing by the control unit the data to prioritize the trailer over other trailers of the plurality of trailers for receipt by the available loading dock.

In another aspect, a method for unloading cargo comprises collecting information regarding an event and outputting the information as the data to a control unit; assigning a trailer to a cargo loading bay in response to data received by the control unit regarding the event requiring the retail goods in the trailer; processing by the control unit the data to prioritize the trailer over other trailers of the plurality of trailers for receipt by the cargo loading bay; positioning the trailer to the cargo loading bay; and performing an unloading operation in accordance with the event.

In another aspect, a computer-readable medium including contents that are configured to cause a computing system to prioritize trailers for unloading retail goods at a distribution center by performing a method comprising: collecting information regarding the event and outputting the information as the data to a control unit; assigning a trailer from the plurality of trailers to be received by an available loading dock in response to data received by the control unit regarding the event requiring the retail goods in the trailer; and processing by the control unit the data to prioritize the trailer over other trailers of the plurality of trailers for receipt by the available loading dock.

In another aspect, a trailer tracking system comprises a plurality of sensors at a destination location for unloading cargo from a trailer; a trailer assignment and prioritization computer that assigns a loading dock for the trailer at the destination location; a trailer assignment and prioritization computer that processes an output of the sensors to assign a loading dock for the trailer at the destination location; a distributed ledger system that includes a blockchain stored at a local database and that receives trailer assignment data from the trailer assignment and prioritization computer and provides event data to the trailer assignment and prioritization computer to establish a match between the loading dock and the trailer, the distributed ledger system further constructed and arranged to transmit an updated blockchain from the local database to a central blockchain database remote from the destination location.

In another aspect, a system for prioritizing trailers attached to vehicles for unloading items from the trailer at a receiving facility is according to a method, comprising monitoring a presence of a plurality of trailers entering a predetermined region of interest relative to a store, each trailer having a shipment, and each trailer having an initial ranking according to a predetermined and estimated receipt by the store of the shipment; linking a machine-readable identifier of the trailers to a stored arrangement of information regarding contents of the trailers; executing a blockchain distributed ledger to store and communicate a trailer identification and information regarding the shipment according to the identifier, and to further track and distribute a status of the shipment; comparing by a special-purpose store computer the status of the shipment and a stored set of store requirements to determine a current need for the shipment; and assigning in real-time a priority to each trailer according to the need for the shipment.

In another aspect, a system for prioritizing trailers attached to vehicles for unloading items from the trailer at a receiving facility comprises: a computer processor that reads a machine-readable label on the trailers as they enter the predetermined region of interest; a computer processor that links the machine-readable label linking to shipment data; and a distributed ledger system that receives the linked machine-readable label and shipment data and transmits an updated blockchain to a central blockchain database remote from the predetermined region of interest.

In another aspect, a trailer tracking system performs steps of a method comprising: ranking trailers as they enter a predetermined region of interest proximal a store; and determining a priority of the trailer in response to executing the blockchain distributed ledger.

In another aspect, a system for assigning a trailer delivering retail goods to an available receiving facility comprises a linking module that electronically links a trailer identification of a trailer of a machine-readable element and a stored arrangement of information regarding contents of the trailer and an allocation engine that assigns the trailer to an available loading dock in response to an output of the linking module, an event establishing a requirement for the contents of the trailer, and item data regarding the contents.

In another aspect, a system for prioritizing vehicle trailers for unloading retail goods at a receiving facility comprises a computer processor that ranks the vehicle trailers as they enter a predetermined region of interest proximal a store; a computer processor that reads a machine-readable label on the trailers as they enter the predetermined region of interest; a computer processor that links the machine-readable label linking to shipment data; and a computer processor that determines a priority of the trailers in response to a result of the linked machine-readable label and shipment data, an event establishing a requirement for contents of the trailer, and item data regarding the contents.

In another aspect, a method for assigning a vehicle trailer delivering retail goods to an available receiving facility comprises electronically linking a trailer identification of a trailer of a machine-readable element and a stored arrangement of information regarding contents of the trailer; and assigning the trailer to an available loading dock in response to an output of the linking module, an event establishing a requirement for the contents of the trailer, and item data regarding the contents.

In another aspect, a computer-readable medium includes contents that are configured to cause a computing system to prioritize trailers for unloading retail goods at a distribution center by performing a method comprising electronically linking a trailer identification of a trailer of a machine-readable element and a stored arrangement of information regarding contents of the trailer; and assigning the trailer to an available loading dock in response to an output of the linking module, an event establishing a requirement for the contents of the trailer, and item data regarding the contents.

BRIEF DESCRIPTION OF THE DRAWINGS

The above and further aspects of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

In this disclosure, described are embodiments of systems and methods for prioritizing trailers for loading or unloading their cargo at a distribution center or other facility. Various factors may be used to prioritize the trailers as they are queued at a distribution center awaiting access to a loading dock. In this disclosure, embodiments of systems and methods for prioritizing loading docks for a particular trailer are also provided.

Trailers may be prioritized in view of "must arrive by date" (MABD) regulations, whereby suppliers are required to deliver ordered products to a designated store or distribution center by a pre-agreed date or pay a penalty fee for non-compliance with the agree-upon delivery date. However, MABD regulations are static and do not allow for variability at a store level. For example, variability at store level may be due to irregular sales patterns, which can affect inventory levels of seasonal items such as rock salt prior to a forecasted snowstorm, product recalls, or other such events. Nor do such regulations consider unanticipated factors with unloading trailers at a planned delivery location such as dock door shortages or the like. This problem is exacerbated when trailers arrive directly at available loading docks on a first-in first-out (FIFO) basis and without consideration for events or other dynamic factors that may affect an urgent need for unloading the trailers on a time-sensitive basis. In some embodiments, the trailers may be assigned in real-time or near real-time to loading docks according to a combination of an event that may occur dynamically, a change in schedule, an inventory update, or other unanticipated factor(s). In some embodiments, an assignment is based on an updated system inventory and requirements as of the time a trailer is removed from the dock door. For example, a trailer may be assigned a dock as another trailer is completing an unloading process. When a trailer is removed from the dock, the system is updated to assign a next trailer to the dock.

Figure 1:
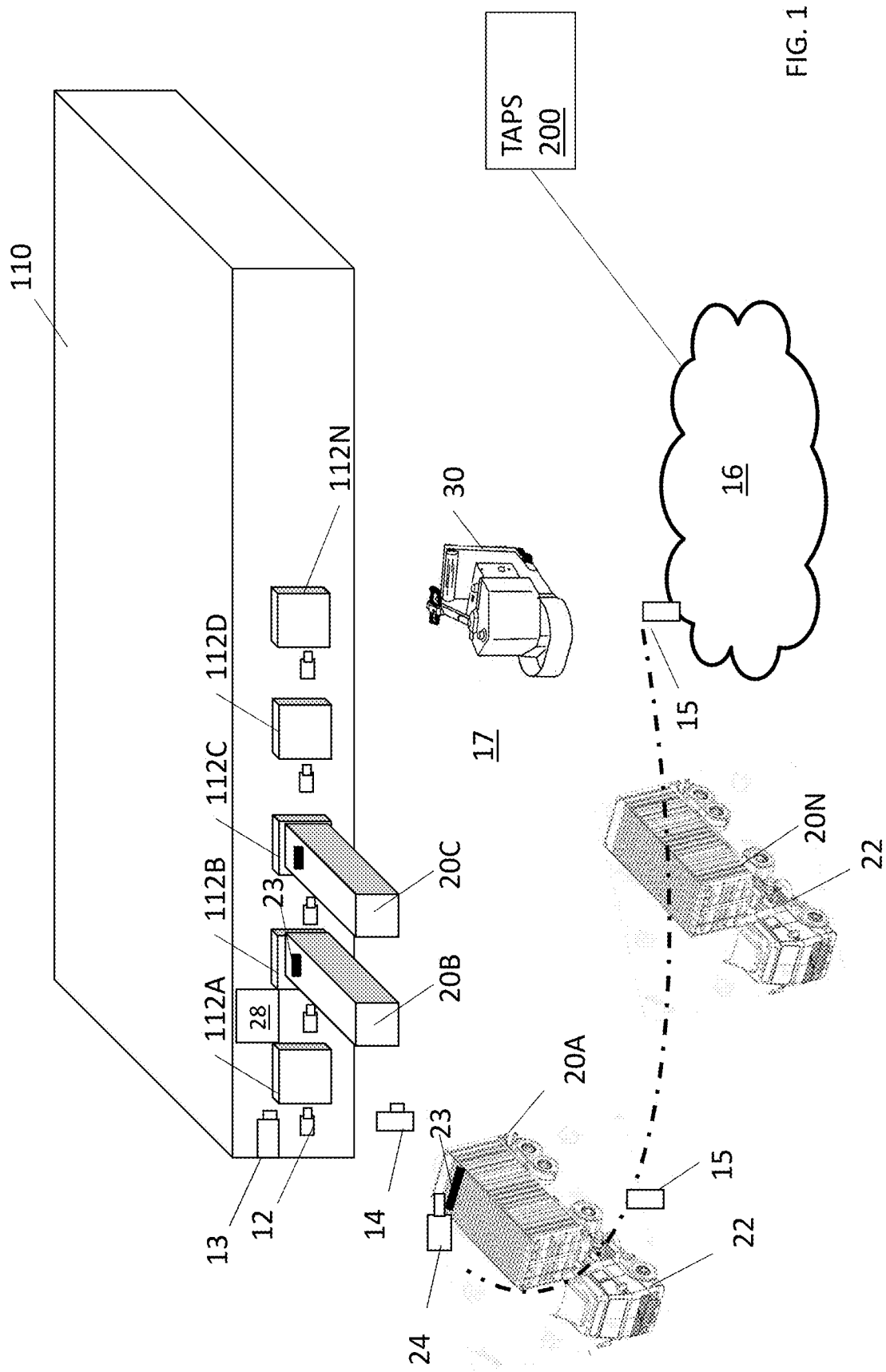
FIG. 1 is a diagram depicting an environment in which embodiments of the present inventive concepts can be practiced.

FIG. 1 is a diagram depicting an environment in which embodiments of the present inventive concepts can be practiced. As shown in FIG. 1, a distribution center 110 has a plurality of loading docks 112A-112N (where N is an integer greater than 1; generally, 112). Although a distribution center 110 is described, warehouses, other storage facilities or buildings for receiving retail goods from a delivery vehicle may equally apply. The loading docks 112, which may include bays, stations, doors, terminals, and so on, provide a location where goods, cargo, or the like can be loaded onto or unloaded from a trailer 20A-20N, where N is an integer greater than 1 (generally, 20). The trailers 20 may be part of, hitched to, or otherwise attached to a powered vehicle 22 such as a car, tractor, truck, cart, train, and so on. In some embodiments, the trailers 20 may be pushed, towed or otherwise moved to an assigned loading dock 112 by the powered vehicle 22. In some embodiments, the trailer 22 may be pushed, towed, otherwise moved to the assigned loading dock 112 by a different powered vehicle 30 than the vehicle delivering the trailer 22 to the yard 17, for example, which may include but not be limited to autonomous, partially autonomous, self-driving, driverless, or driver-assisted carts or related ground vehicles 30. A ground vehicle 30 may be controlled by the trailer assignment and prioritization system 200, which can output control signals or the like that are received, processed, and executed by the ground vehicle 30, and the ground vehicle 30 in response performs a function according to the received control signal(s). For example, the system 200 can control the ground vehicle to remove one trailer from the dock door and retrieve another trailer according to its ranking calculated by the system.

A yard 17 or parking lot or other location at where the trailers 20 are queued can accommodate some or all vehicles 22 and associated trailers 20 waiting for access to an available loading dock 112. The yard 17 may be monitored by a geofence system 15 and/or a plurality of electronic sensors such as an RFID reader 24 for identifying trailers 20 of interest. The geofence system 15 may comprise a plurality of sensors, computer network devices, wireless technology such as global positioning satellite (GPS) and/or radio frequency identification (RFID) that operate together to form a virtual boundary or perimeter about some or all of the yard 17 to trigger a response when a trailer 20 enters or leaves the yard 17. The geofence system 15 automatically outputs a data signal via an electronic communications network 16 or directly to a trailer assignment and prioritization system 200 for identification of the trailer 20 entering the yard 17. In particular, an electronic communication is established between a mobile device, emitter, or other computing device at the trailer 20 and/or corresponding vehicle 22 and a wireless receiver of the geofence system 15, which automatically triggers an output indicating a detection by the geofence system 15 of the trailer 20.

A function of the trailer assignment and prioritization system 200 is to manage the utilization of the loading docks 112 by the trailers 20. For example, the trailer assignment and prioritization system 200 may generate and output a computer instruction to one or more of a vehicle computer 50, a store computer (not shown), a mechanical switch of a gate, door, or the like at an entrance to the yard 17, a personal computing device such as a smartphone, and/or other electronic devices capable of identifying and controlling access to an available loading dock 112 for a particular trailer 20, or identifying a trailer 20 for unloading its contents at a specific loading dock according to predetermined criteria.

Another function of the trailer assignment and prioritization system 200 may be to generate and output a signal to activate or inactivate various apparatuses such as fences, lights, gates, doors, and so on in response to the trailer assignment and prioritization system 200 establishing a match between a selected trailer 20 and a selected loading dock 112. For example, the trailer assignment and prioritization system 200 can output via the network 16 a command to a controller 28 that in response automatically opens a door to an interior of the facility 110 at loading dock 112A when loading dock 112A is selected for unloading the contents of trailer 20A.

The trailer assignment and prioritization system 200 can control other elements of the distribution center 110 and yard 17 so that the trailer 20 can be received at the loading dock 112 without interruption or impediments, for example, due to another trailer parked at a selected loading dock 112A. Here, a sensor 12 at loading dock 112A can detect the presence another trailer and submit via the trailer assignment and prioritization system 200 a message to the driver of the vehicle 22 attached to the other trailer, or to an unmanned vehicle which in response automatically removes the other trailer, and so on.

In some embodiments, a sensor 12 at the distribution center 110 can scan pallets or the like to determine whether a loading or unloading process is underway, to identify goods on the pallets to confirm that they are the goods of interest established by the trailer assignment and prioritization system 200 for the particular loading dock 112. For example, trailer 20B may be assigned to loading dock 112B because the trailer assignment and prioritization system 200 has established that the trailer 20B contains a load of snowblowers of which a store is in need due to an anticipated snowstorm. The sensor 12 can confirm that snowblowers are in fact being unloaded from trailer 20B, and if not, then the trailer assignment and prioritization system 200 can receive a message of this and automatically send messages, signals, or the like to relevant electronic devices to remove the trailer 20B, or stop the unloading of contents of the 20B currently underway, and/or reassign trailer 20B to a different loading dock 112.

In addition to the abovementioned sensors 12 at the loading docks 112, in some embodiments, an array of sensors 14 are arranged in the yard 17, trailers 20, vehicles 22, autonomous towing vehicles 30, and distribution center 110 for collecting data that is received and processed by the trailer assignment and prioritization system 200 to perform operations related to an assignment of one of a trailer 20 and a loading dock 112 to the other of the trailer 20 and loading dock 112. In some embodiments, the system instructs an autonomous vehicle 30 to remove cargo from the trailer 20 after the trailer 20 is parked at the loading dock 112 to initiate a loading or unloading operation.

The sensors 14 can provide information about a particular trailer 20, for example, trailer size, contents, etc. to establish whether it is capable of unloading cargo at a particular loading dock 112, whether it is authorized by the trailer assignment and prioritization system 200 to be present at the loading dock 112, and so on.

Figure 2:
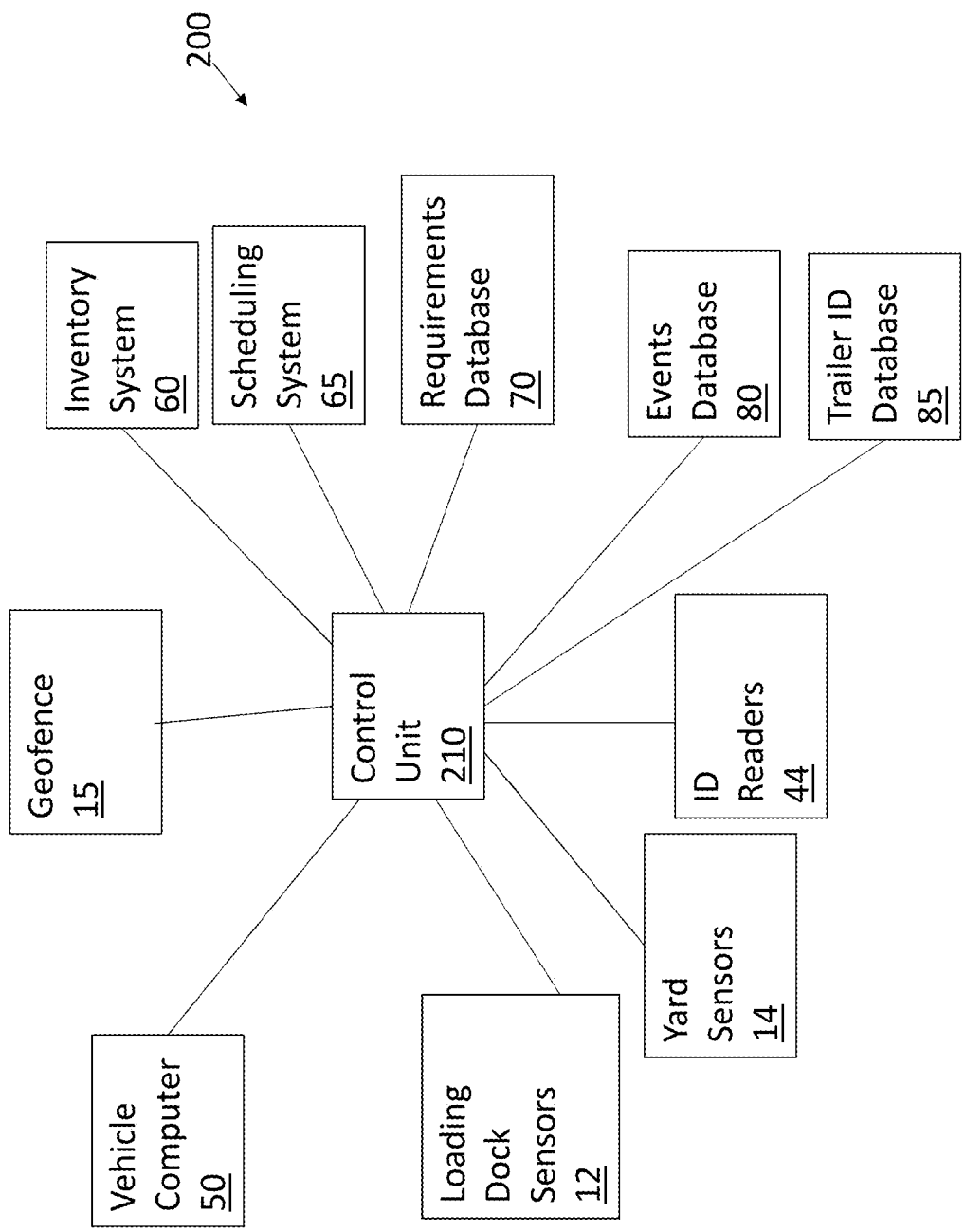
FIG. 2 is a block diagram of a trailer assignment and prioritization system of FIG. 1, in accordance with some embodiments.

FIG. 2 is a block diagram of a trailer assignment and prioritization system (TAPS) 200, in accordance with some embodiments.

As shown in FIG. 2, the trailer assignment and prioritization system 200 includes, but is not limited to, a control unit 210 that exchanges data signals, for example, via network 16 of FIG. 1, with one or more of the geofence system 15, vehicle computer 50 and/or other electronic devices of the trailers 20, vehicles 22, autonomous towing vehicles 30, inventory system 60, scheduling system 65, requirements database 70, events database 80, trailer ID database 85, and one or more sensors 12, 14, 44 in order to manage the selection of trailers 20 and/or loading docks 112 for loading or unloading operations.

The vehicle computer 50 exchanges data regarding the vehicle 22 and/or autonomous towing vehicles 30, and any compliance with the ranking, prioritization, and assignment of the trailer 20 to which the vehicle 22 is attached or otherwise part of. For example, the vehicle computer 50 may store information about a current cargo in the trailer 20. This information may be required by the control unit 210 to identify a loading dock 112 for receiving the trailer 20. In some embodiments, the vehicle computer 50 is part of a dashboard or console, and can facilitate messages, alarms, notifications, and so on to a display, audio speaker, or other device for receipt by a driver of the vehicle 22. The vehicle computer 50 can instruct the driver to park the trailer 20 at an available parking spot, or to dock the trailer 20 at an assigned loading dock 112. In another example, the control unit 210 may determine from the vehicle computer 50 that the trailer 20 contains perishable foods that must be unloaded quickly. In another example, the vehicle computer 50 may determine from the vehicle computer 50 that the trailer 20 is of a height that prevents a particular loading dock 112 from being used to unload goods from the trailer 20. Similarly, a loading dock 112 may have a door that is configured for stable stock, cross-dock, and so on, or have dimensions, configurations, or features, which are undesirable or incompatible for some trailers 20.

The inventory system 60 may be part of a store computer that stores and processes retail inventory data, which can be used by the control unit 210 to associate a loading dock 112 with a trailer 20 in real-time or near real-time. For example, the inventory system 60 may reveal that a retail store has a low supply of fresh vegetables. The control unit 210 can assign the next available loading dock, for example, 112A to a trailer 20A, which is known by the trailer assignment and prioritization system 200 to be delivering a supply of fresh vegetables. Time may be of the essence with respect to fresh vegetables if they remain in the yard 17 for an unreasonable amount of time. Therefore, trailer 20A may be moved to the top of a trailer priority queue due to the store's immediate need for fresh vegetables and due to the risk of damage to the vegetables if they remain in the trailer 20A in the yard 17 for an extended period.

In some embodiments, inventory such as staple stock is stored in the distribution center 110 as a buffer to store demand. In some embodiments, other inventory such as cross-dock is inventory is loaded on a conveyor at the receiving dock and taken to an inventory queue for a specific store's trailer. Store need may pertain to cross-dock items, which always have no distribution center inventory on hand. Staple stock items account for the distribution center inventory on hand before prioritizing a trailer to unload. If the distribution center has sufficient inventory to meet a store demand, then the trailer is not a priority, and the system processes this factor when prioritizing trailers.

In some embodiments, the scheduling system 65 processes MABD planner data, for example, shipment delivery information. In some embodiments, the scheduling system 65 provides a user interface for entering shipment information to the scheduling system 65, for example, to modify a shipping schedule in response to a shipment delivery date requests. This data can be used by the control unit 210 to identify trailers, delivery contents, and so on for assigning a loading dock 112.

The requirements database 70 stores status data regarding store-specific requirements. For example, the store may establish a set of compliance regulations to ensure that specific products are delivered to the distribution center 110 within a certain time or be subject to a "late fee" for non-compliant deliveries. For example, a supplier may be subject to a store's MABD regulations, which are activated at the time the order is placed for specific goods. Data from the scheduling system 65 may establish the parameters of a current shipment under the MABD regulations. The information may be stored at the requirements database 7 as data records, which may include additional fields, for example, fields that include a static value including the date of the order, and an event code of the purchase order indicating when the ordered product is required in the store. The control unit 210 may receive and process this data to perform one or more method steps described herein. For example, the control unit 210 may process this data to provide rankings in real time to trailers entering the yard 17 to prioritize trailers among many trailers currently in the yard 17 awaiting an available loading dock 112. The requirements database 70 may receive and store store-level data. The requirements database 70 may receive replenishment forecast data from the inventory system 60 or other store computer, for example, which can be added to a store requirements record 93 (see FIG. 4), which in turn can be processed by the control unit 210 along with outputs of the events database 80, e.g., event data 91 (see FIG. 4), to identify an event where a store is in need for particular goods in a trailer 20. The control unit 210 in turn can determine a priority of particular trailer 20 due to its contents as compared to a store need based on the data stored in the requirements database 20. For example, the control unit 210 can determine from the inventory system 60 a current state of certain goods and determine from the known contents of a trailer 20 whether those contents satisfy an inventory need in the distribution center 110. If so, then the trailer 20 may be moved up in a priority queue 222 (see FIG. 4) whereby the trailer 20 is next in line for an available loading dock 112.

The events database 80 collects and stores event-related information that may be used by the control unit 210 to establish a requirement by the store, or store demand, for particular items delivered in specific trailers 20. For example, the events database 80 may store calendar information indicating time periods, dates, etc. when high customer demand is anticipated, such as the day after Thanksgiving ("Black Friday"). The control unit 210 can process forecast data received from the requirements database 70 and event data from the events database 80 to anticipate when a store will require a particular item. This data can be used to identify trailers 20 carrying that item of interest and prioritize the trailers 20 accordingly. The events database 80 can store other anomalous information relevant to the assignment and prioritization of trailers with respect to access to a loading dock 112, such as a power outage at a store, a modification such as a change from Halloween to Christmas at a store, an unexpected and urgent need for a particular item, low inventory levels of particular items, the impact of demurrage due to a delayed shipment, and so on.

In some embodiments, the control unit 210 during operation receives information from the geofence system 15 that trailers 20 and/or corresponding vehicles 22 are entering the yard 17. In particular, the geofence system 15 can read a machine-readable identifier such as a trailer identification (ID) 23 on the trailer 20 and/or vehicle 22 and assign an initial ranking to the trailer 20 and for identifying a loading dock 112 for the trailer 20 when that loading dock 112 becomes available. The trailer ID 23 can include data encoded on a tag or the like that identifies the trailer 20 such as information regarding contents of the trailer 20. The trailer ID 23 can be compared to trailer identifications stored at a database 85 so that specific configuration information or the like of the trailer 20 can be retrieved by the control unit 210.

Figure 3:
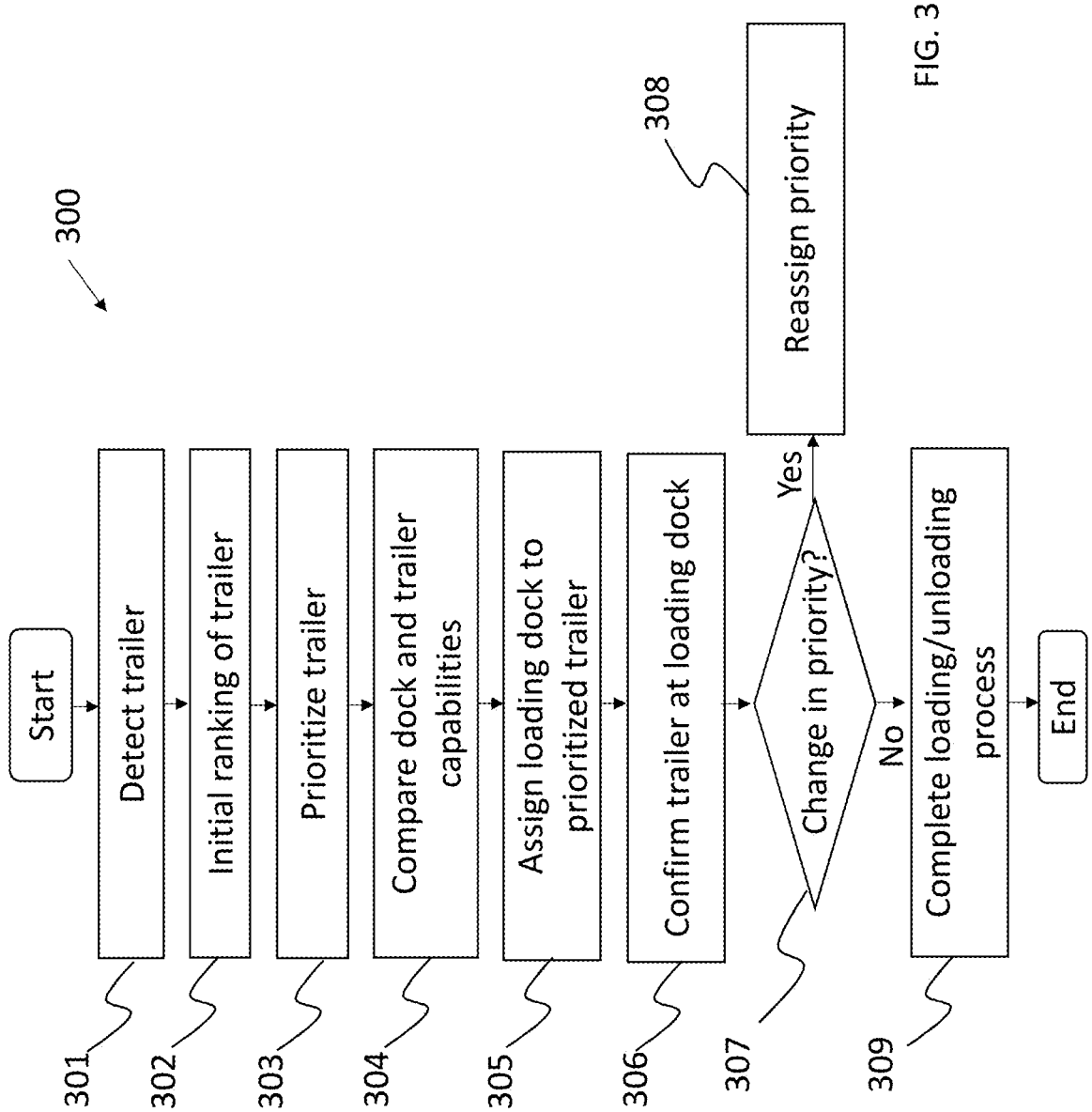
FIG. 3 is a flow diagram of a method for prioritizing trailers for a loading dock, in accordance with some embodiments.

FIG. 3 is a flow diagram of a method 300 for prioritizing trailers for a loading dock, in accordance with some embodiments. In describing the method 300, reference is made to elements of FIGS. 1 and 2. Although the method 300 pertains to the prioritization of trailers 20, other embodiments are not limited thereto, and can include the prioritization of other storage or delivery vehicles.

At block 301, a plurality of trailers 20 entering a yard 17 of a distribution center 110 or other facility is detected. For example, detection technology such as a geofence system 15 and/or sensors 14 illustrated in FIG. 1 such as a monitoring cameras or the like may detect trailers 20 entering the yard 17, and are at a predetermined region of interest relative to the loading docks 112 of the distribution center 110. A plurality of trailers 20 may temporarily reside in the yard 17 as they await an assignment to a loading dock 112.

At block 302, each trailer 20 is provided an initial ranking when an order is placed for goods for delivery to the distribution center 110. In some embodiments, the trailers are initially ranked 20 by the system 200 when an order is placed for goods and the goods are scheduled for delivery. In other embodiments, the trailers 20 are ranked when detected by the geofence system 15 at block 301. In order to rank a trailer 20, the trailer 20 may be have an identification (ID), for example, an RFID tag which can be read by a reader 13, 24 and/or by a detector of the geofence system 15 to determine the identity of the trailer 20 from a stored set of trailer information in the trailer ID database 85. The rank may or may not change depending on events determined in real-time that may warrant an expedited unloading of a trailer of interest. The initial ranking may be determined according to a predetermined and estimated receipt by the store of the shipment. The initial ranking of a trailer 20 may be established by an MABD regulation, which is set when an order is placed for goods in the trailer 20.

Referring again to FIG. 1, the trailer assignment and prioritization system 200 may recognize from trailer information in the requirements database 70 that trailer 20A is on schedule and in compliance with a predetermined delivery date and therefore receives a ranking that permits the trailer 20 to be moved to a next available loading dock 112. This ranking may be higher than trailer 20N that arrived earlier than trailer 20A but nevertheless arrived two days after its MABD-determined arrival date. The requirements database 70 may also store records regarding purchase orders, and more specifically, record fields including event codes or the like indicating when items in the purchase order are planned for receipt or otherwise required for delivery to the store in order to satisfy inventory requirements, comply with MABD requirements, and so on. The control unit 210 may process the records, along with other inputs from the various systems shown in FIGS. 2 and 4 to generate the initial trailer rankings, which as described in block 303 can be modified in real-time or near real-time in response to status changes. In another example, detection devices such as an ID reader 13, 24 may be used to scan a trailer ID 23 of the trailer 20 to identify the trailer 20 and to determine if the trailer 20 complies with MABD requirements, for example, establishing a time stamp corresponding to an arrival time of the trailer 20. The trailer ID 23 can be output to the trailer assignment and prioritization system 200 for further processing. The trailer ID 23 can include information about the trailer 20 or be used to retrieve such information from the trailer ID database 85, such as its size, dimension, history, current contents, and so on, which can be used by the control unit 210 to assign the trailer 20 to a loading dock 112.

At block 303, an identified and ranked trailer 20 is further prioritized. Trailer prioritization is determined in a different manner than the ranking step described in block 302. Here, one or more of the scheduling system 65, requirements database 70, events database 80, or trailer ID database 85 can provide factors that establish the prioritization of the trailers 20 in real-time or near real-time. In one example, the events database 80 may receive and store data indicating that the store has experienced a power outage. This data may including a timestamp including the time, date, and conditions when the power outage occurred. This data can be used to compare to contents of various trailers 20 in the yard 17 and/or anticipated as arriving at the yard 17. For example, a trailer 20 may be determined to include power generators, which may be useful during power outages. This data is relevant if a power outage indeed occurs due to an expectation of a demand for the power generators.

Figure 4:
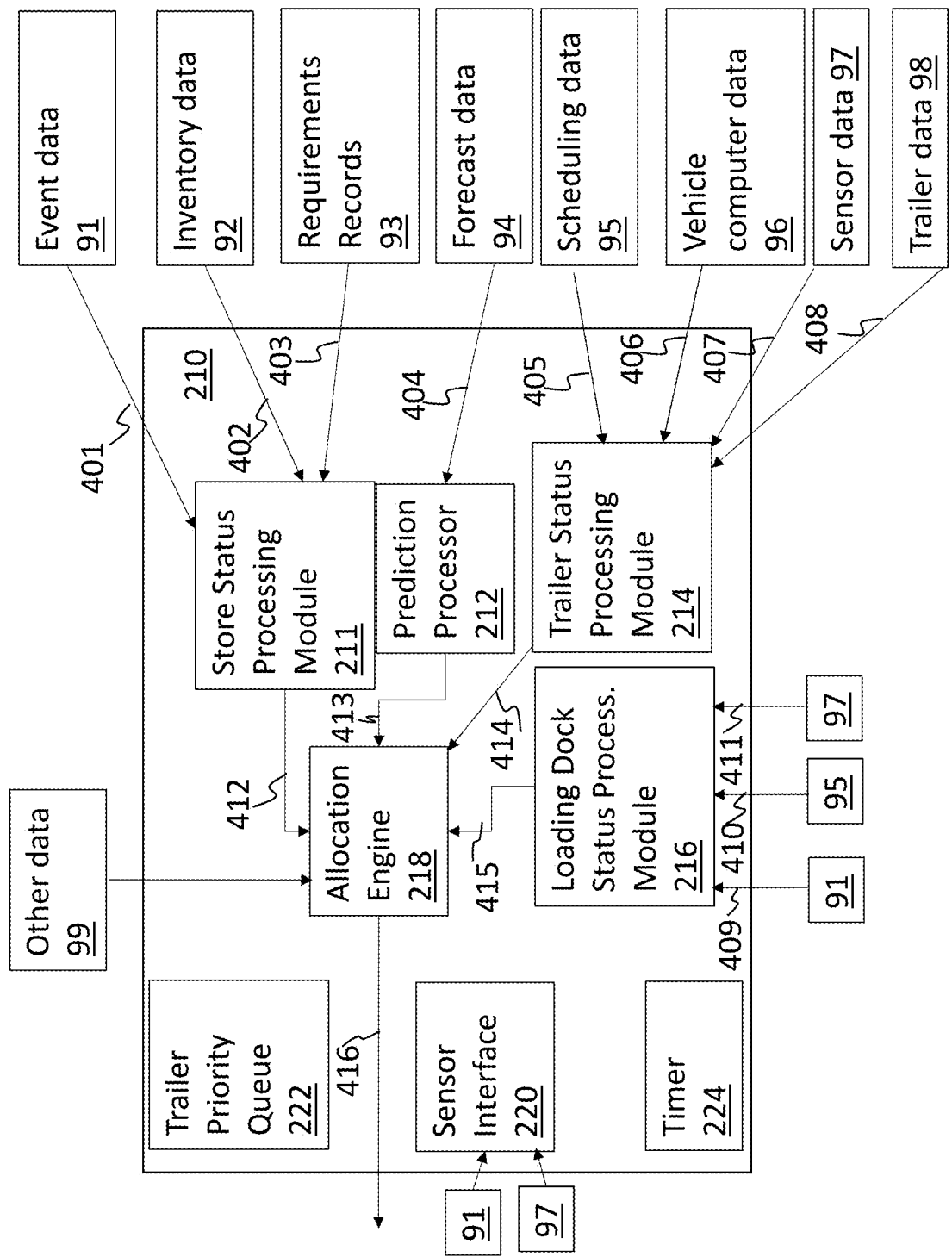
FIG. 4 is a block diagram illustrating data flow paths between elements of the trailer assignment and prioritization system of FIGS. 1-3, in accordance with some embodiments.

In some embodiments, two trailers 20, e.g., 20A and 20N shown in FIG. 1, may arrive at the yard 17 at approximately the same time, and include the same contents, and otherwise receive an equal initial ranking by the system 20. The scheduling system 65, trailer ID database 85, sensors 14, and/or other electronic devices and computers of the trailer assignment and prioritization system 200 can confirm the cargo of each trailer 20. Here, the prioritization process may determine that two trailers 20A, 20N are equally needed. In some embodiments, the trailer that arrived at the distribution center 110 first is unloaded first. In some embodiments, a separate set of data records may be accessed by the control unit 210 from one or more of the inventory system 60, scheduling system 65, requirements database 70, events database 80, trailer ID database 85, and/or other repository such as an artificial intelligence system that include relevant information for selecting the priority of the two trailers 20A, 20N. For example, although the two trailers 20A, 20N may include the same cargo, the first trailer 20A may have driven a substantially greater distance than the second trailer 20N, and the cargo may include perishable items that require stocking at the store at an earlier time than those of the second trailer 20N. This data may be used to prioritize trailer 20A over trailer 20N. In some embodiments, criteria establishing the priority of one trailer over another may be different when the cargo is the same, when the trailers arrive at the same time, and so on. The criteria may be user-defined and executed by an allocation engine 218 of the control unit 210, as shown in FIG. 4.

At block 304, a loading dock 112 is identified as being available for a prioritized trailer 20. Referring to the previous example, in determining trailer priority, the trailer 20 carrying snowblowers may move to the front of a priority queue 222 (see FIG. 4) for authorization to arrive at a particular loading dock 112 for expedited unloading. In doing so, an additional step may be performed to confirm that that the available loading dock 112 is capable of receiving and accommodating the prioritized trailer 20. The trailer assignment and prioritization system 200 may store information about the loading docks 112, for example, door height, extendable dock ramp, temperature at the loading dock, and so on. Sensors 12 such as cameras, monitors, temperature sensors, and so on at the distribution center 110 can collect data such as a current temperature. This information may be compared to known information about the trailer 20 to confirm that the trailer 20 is not too large, or whether the loading dock 112 is suitable for receiving the contents of the identified trailer 20.

At block 305, an appropriate available loading dock 112 is assigned to the prioritized trailer 20 in response to a determination of compatibility between trailer 20 and loading dock 112. The system 200 can output a notification of the assignment to an electronic device, for example, a display of a user's smartphone, or output a signal to a security system at the distribution center 110 that in turn opens a door, activates a light beacon, etc. that informs a vehicle operator to move the assigned trailer 20 to the available loading dock 112.

At block 306, the trailer 20 is confirmed to be at the correct loading dock 112. In some embodiments, an RFID reader 13 is present to verify that the correct trailer has been placed at the correct dock door prior to unloading. The RFID readers 12 at the selected loading dock 112 may scan the trailer 20 and/or its contents to verify that the correct trailer has been placed at the correct dock door prior to unloading.

At decision diamond 307, during an unloading of cargo in the current trailer 20 at the loading dock 112, a determination may be made by the trailer assignment and prioritization system 200 whether to reassign a priority to a different trailer due to an event such as a particular product of interest that was out of stock in the distribution center 110 has been unloaded, even if other products remain on the current trailer 20. Here, the arrangement and listing of trailers 20 in the priority queue 222 may be reordered. The trailer assignment and prioritization system 200 can dynamically monitor an environment at the store, the loading dock 112, distribution center 110, yard 17, and/or data provided by elements of the trailer assignment and prioritization system 200 to determine whether conditions have changed warranty a reassignment in priority. If yes, then the method proceeds to block 308 where the priority is reassigned. Here, the trailer assignment and prioritization system 200 may identify a different trailer for the loading dock 112 based on a prioritization technique executed according to embodiments described herein. In some embodiments, the trailer assignment and prioritization system 200 receives data from the current trailer 20 as to unloading details, for example, which cargo was unloaded and a listing of current cargo not unloaded. In some embodiments, the current trailer 20 is temporarily removed from the loading dock 112 but can return to the loading dock to unload the remaining cargo. The current trailer 20 may be removed from the loading dock 112, for example, by automatically controlling a ground vehicle 30 to couple to the current trailer 20 and remove it from the loading dock 20 or by outputting an instruction, textual request, or other notification to a computer capable of displaying the notification or otherwise acting upon the notification to remove the trailer 20. If at decision diamond 307, a determination is made that there is no change in priority, then the method proceeds to block 309, where the loading or unloading process is completed.

FIG. 4 is a block diagram illustrating data flow paths between elements of the trailer assignment and prioritization system of FIGS. 1-3, in accordance with some embodiments.

In some embodiments, the control unit 210 includes but is not limited a store status processing module 211, a prediction processor 212, a trailer status processing module 214, a loading dock status module 216, an allocation engine 218, a sensor interface 220, a trailer priority queue 222, and a timer 224. Some or all the store status processing module 211, prediction processor 212, trailer status processing module 214, loading dock status module 216, allocation engine 218, sensor interface 220, trailer priority queue 222, and timer 224 may be implemented in hardware such as a special purpose computer processor, software, or a combination thereof. Some or all of these elements of the control unit 210 may be stored and executed at a common hardware computer platform, or at different computers in communication with each other via a network, e.g., data network 16 of FIG. 1.

In some embodiments, the store status processing module 211 is constructed and arranged to receive a combination of event data 91, inventory data 92, and requirements record 93 via data flow paths 401, 402, and 403, respectively, from the events database 80, inventory system 60, and requirements database 70, respectively. In some embodiments, one or more of the event data 91, inventory data 92, and requirements record 93 are output to the store status processing module 211 from sensors or other electronic devices constructed and arranged to monitor store shelves for inventory status, events such as alarms or the like, and so on. For example, the store status processing module 211 may receive via data flow path 401 a notification of a power outage at the store, the deployment of a new modular location in the store requiring specific previously unavailable products for the store, or other event information that is received and stored at the events database 80. In addition, the store status processing module 211 may receive via data flow path 402 information from the inventory database 60 regarding a current shortage in the store of several different products, including blankets and water. In addition, the store status processing module 211 may receive via data flow path 403 a data record including purchase order data regarding a request and planned delivery for blankets and water. The inputs received from data flow paths 401-403 can determine a current status at a store regarding the need for particular items in view of various events. Although three data flow paths are described with reference to FIG. 4, the store status processing module 211 may be configured to receive status information via more than three data flow paths.

The prediction processor 212 is constructed and arranged to receive via data flow path 404 forecast data 94, which may be output from one or more of the inventory system 60, requirements database 70, and/or a cognitive computing or artificial intelligence system (not shown). For example, the prediction processor 212 may receive replenishment forecast data indicating that the store will be depleted of water in seven days.

The trailer status processing module 214 is constructed and arranged to receive a combination of scheduling data 95, vehicle computer data 96, sensor data 97, and trailer data 98 via flow paths 405, 406, 407, and 408, respectively, but not limited thereto. The trailer status processing module 214 can receive via flow path 405 from the scheduling system 65 scheduling data 95 such as shipment delivery information as it pertains to a particular trailer 20 of interest, for example, a trailer 20 identified as a candidate for a particular loading dock 112. The trailer status processing module 214 can receive via flow path 406 from a computer 50 of the trailer 20 or vehicle 22 data 96 regarding current location of the trailer 20, changes in delivery schedule or cargo, and so on. The trailer status processing module 214 can receive via flow path 407 from various sensors or other electronic devices data 97 regarding the trailer 20, its cargo, for example, a change in temperature in the trailer 20 that may impact the quality of produce among the cargo, or other information. For example, sensors 12, 14, 15, and 44 at or in the yard 17 may provide sensor data 97. Other sensor data 97 may relate to a loading dock 112, for example, a change in temperature of a storage facility proximal the loading dock 112 that renders it unfeasible to deliver fresh produce to that particular loading dock 112. The trailer status processing module 214 can receive via flow path 408 from the trailer ID database 85 information 98 that qualifies the trailer 20 by a specific configuration information or the like for a loading dock 112.

The loading dock status processing module 216 is constructed and arranged to receive, but not limited to, a combination of the event data 91, scheduling data 95, and sensor data 97, via flow paths 409-411, respectively. Although three data flow paths are described with reference to FIG. 4, the loading dock status processing module 216 may be configured to receive status information via more than three data flow paths. In some embodiments, the store status processing module 211, trailer status processing module 214, and loading dock status processing module 216 are a single processing module having multiple inputs for receiving the various data flow paths 401-411.

The allocation engine 218 is constructed and arranged to receive via flow paths 412-415, respectively, processed outputs from store status processing module 211, prediction processor 212, trailer status processing module 214, and loading dock status processing module 216, respectively. The allocation engine 218 may also receive relevant data 99 from other sources, for example, a cognitive computer (not shown) that provides the data 99 to identify a match between a trailer 20 and loading dock 112 for receiving the trailer 20. For example, the allocation 218 can process data received from the various system components to establish a status of a particular trailer 20 that the trailer 20 is ahead of a schedule according to the scheduling data 95, data indicating that the trailer 20 has crossed the geofence system 15, data indicating that a store in communication with the distribution center 110 has a low inventory of water and blankets according to the inventory data 92, and data indicating that the cargo in the trailer 20 includes the needed blankets according to vehicle computer data 96 if a predicted blizzard occurs as provided by the event data 91. The inventory data 92 may include other data from the inventory system 60 such as item information, e.g., an expiration date on canned goods or allergy warnings regarding certain items, which may be processed by the system 200. The event data 91 may be provided by the events database 80 and/or other weather data source such as a website of a weather service provider, local news repository, and so on. Additional data 99 from an artificial intelligence computer may corroborate the weather data, or provide additional weather predictions. In some embodiments, anticipated events such as Black Friday may trigger the allocation engine 218 to reserve a trailer 20 in the yard 17 for the duration of the event which is known to contain cargo that may be required during the event. Here, the control unit 210 can manage the availability of a loading dock 112 so that the trailer 20 operates as a backup where its contents can be quickly unloaded from the loading dock 112 if and when it is available for the reserve trailer 20.

The allocation engine 218 outputs via flow path 416 a result of a determination by the allocation engine 218 that identifies a trailer 20 for an available loading dock 112 and/or identifies a loading dock 112 for a trailer 20 of interest. The result may be provided as part of a data signal that is output to a remote computer via a data network 16. The remote computer may be a vehicle computer 50 that informs a vehicle operator of the availability of a particular loading dock 112. In another example, the result may be output from the allocation engine 218 to a ground vehicle, for example, an AGV that in response automatically moves to the trailer 20, connects to the trailer 20, and moves the trailer 20 to the specified loading dock 112. In another example, the allocation engine 218 may output a signal to a door of the loading dock 112, which in response automatically opens as the trailer 20 approaches the loading dock 112.

Although the allocation engine 218 is described with respect to the flow paths of FIG. 4, in some embodiments, the allocation engine 218 is constructed and arranged to identify trailers 20 for loading docks 112 as described in the method 300 of FIG. 3. In other embodiments, the allocation engine 218 is constructed and arranged to identify loading docks 112 for a particular trailer 20 as described in method 500 of FIG. 5.

The sensor interface 220 may communicate with various sensors or other electronic devices to receive sensor data 97 that may be processed to determine a status of the trailers 20 and/or loading docks 112. For example, the sensor interface 220 may receive data from a sensor 14 in the yard 17 regarding the presence of a trailer 20 allocated to a loading dock 112. The control unit 210 may process this data to determine that the trailer 20 is not moving. The timer 224 may be activated and confirm this. The control unit 210 may output a signal allocating a different trailer 20 to the loading dock 112 if the original allocated trailer 20 is not detected by loading dock sensor 12 within a predetermined amount of time. This feature improves efficiency of the arrangement and assignment of trailers 20 to loading docks 112.

In some embodiments, the sensor interface 220 controls various sensors to open trailer doors, loading dock doors, verify shipments, and other functions perform by the sensors. Examples of sensors may include, but not be limited to the loading dock sensors 12, yard sensors 14, ID readers 44, geofence system 15, and/or other sensors in the trailers and/or distribution center 110 or other facility for receiving contents of a trailer 20. In some embodiments, the sensor interface 220 receives event data 91 that may identify a dynamic change in an event status. For example, a natural disaster may occur when all loading docks 112 are currently occupied. Here, the event data may provide a signal to the sensor interface, which determines a status of availability of the loading docks 112 in view of the natural disaster. The allocation engine 218 may output via data flow 416 one or more signals that instruct other computers, devices, or relevant apparatuses to reallocate trailers so that trailers carrying cargo useful or popular during such natural disasters are given priority to the loading docks 112.

Figure 5:
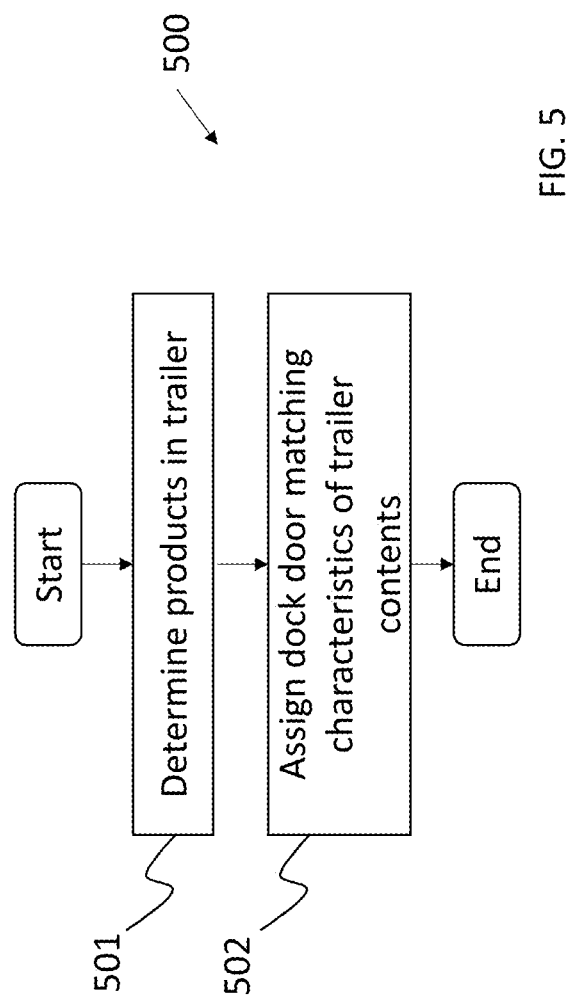
FIG. 5 is a flow diagram of a method for prioritizing loading docks for a trailer, in accordance with some embodiments.

FIG. 5 is a flow diagram of a method 500 for prioritizing loading docks 112 for a trailer, in accordance with some embodiments. Although the method 500 pertains to the prioritization of loading docks 112, the method 500 may include some or all steps described with respect to FIG. 3.

At block 501, the contents of a trailer 20 are determined by a combination of data 91-98 described with reference to FIG. 4. For example, referring to FIGS. 1-4, the inventory system 60 may output inventory data 92 that includes a listing of items shipped with and inside trailer 20A, which is corroborated with vehicle computer data 96 and/or sensor data 97, for example, confirming that the items identified on the listing are indeed located in the trailer 20A

At block 502, the control unit 210 assigns a loading dock 112 to a trailer 20 that matches the characteristics of the contents of the trailer 502. For example, the vehicle data 98 may establish a size of a door of the trailer 20, which can be used to confirm whether the door conforms with the loading dock 112.

As shown and described with respect to FIGS. 6-9, other embodiments of the inventive concepts include a distributed ledger system that stores data regarding a trailer identification encoded in a machine-readable tag or the like and corresponding trailer content data and shipment information of a purchase order, cargo manifest, bill of lading, or the like, and processes this data, for example, to update supply chain records in real-time, to permit an authorized party along or otherwise part of a transportation chain to obtain information about a current load on a trailer. For example, shipping details may be processed as a data transaction at each interaction with a trailer carrying cargo destined for a store.

In some embodiments, a trailer assignment and prioritization system communicates with the distributed ledger system to reduce or eliminate demurrage charges by exchanging data regarding the amount of time that a trailer carrying cargo remains in the yard of a distribution center, warehouse, terminal, or other delivery location and allowing for the tracking of items in the cargo and/or the trailer itself. This data exchange provides transparency and a better flow of information between third party stakeholders or other participants in the transportation chain from the location of origin where the cargo is provided to the trailer to the distribution center, warehouse, or other last mile location where the cargo is unloaded from the trailer for distribution to the retail store. In addition, a backlog of trailers in the yard awaiting unloading at an available loading dock or the like can be reduced since the distributed ledger system provides for improved data quality and access to data, which in turn reduces unload times as compared to the time-consuming use of conventional paper documents.

In particular, the distributed ledger system implements blockchain technology to store and process data that includes a combination of the trailer identification, corresponding shipment information, and event data regarding an event where a store is in need for particular goods in a trailer or according to a status of items in the distribution center and/or retail store. A blockchain instance, for example, pertaining to a particular trailer, can be stored in a database and updated with additional relevant data as the trailer travels to the desired delivery location so that a secure detailed status of the trailer and its contents can be monitored. In doing so, interested parties can understand when a trailer shipped and when it arrives at its intended destination to determine demurrage charges. The arrangement of data in a blockchain allows trailers to be prioritized for use at a particular loading dock by ensuring accurate data of which items are on the trailer. For example, a supplier may not ship all items on a purchase order. Here, the system allows for improved prioritization because the priority may be driven from an item that is not on the trailer.

Figure 6:
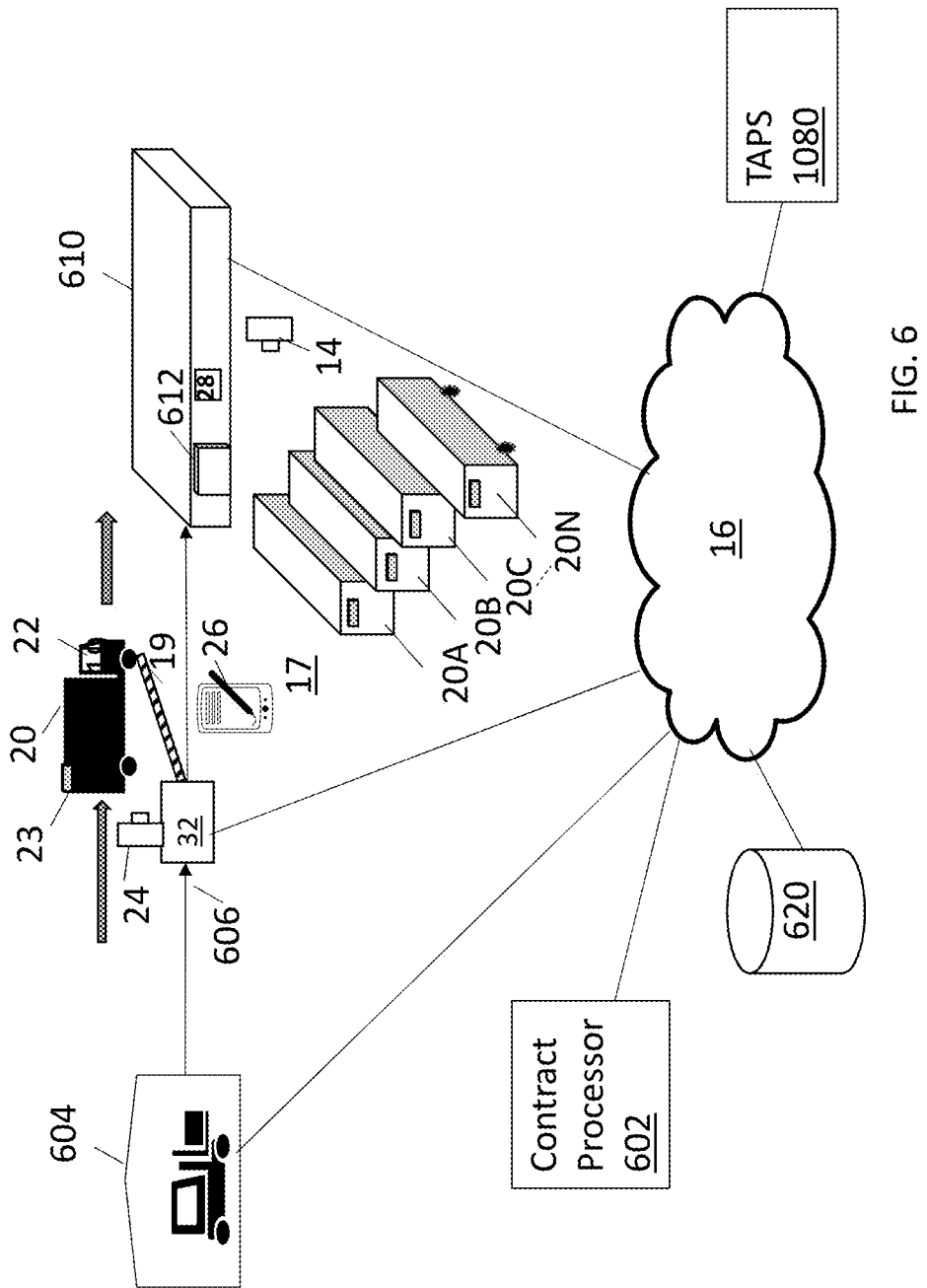
FIG. 6 is a diagram depicting an environment in which embodiments of the present inventive concepts can be practiced.

FIG. 6 is a diagram depicting an environment in which embodiments of the present inventive concepts can be practiced. Combinations of elements of the environment shown in FIG. 6, in particular, at least a ledger distribution system 620 and trailer assignment and prioritization system (TAPS) 600, can generally be referred to as a trailer tracking system. FIG. 6 illustrates a transportation chain from location of origin 604 to a destination location 610 such as a receiving facility where a cargo trailer 20 is unloaded. The destination location 610 can be a distribution center, warehouse, or other storage facility or building for receiving retail goods from a delivery vehicle. A plurality of trailers 20A-20N (generally, 20) are queued in a yard 17 await instructions for approaching an available loading dock 612 for unloading cargo. The receiving facility 610 can have one or more loading docks 612

A trailer 20 may be part of, hitched to, or otherwise attached to a powered vehicle 22 such as a car, tractor, truck, cart, train, and so on. In some embodiments, at the distribution center 610, the trailer 20 may be pushed, towed or otherwise moved to an assigned loading dock 612 by the powered vehicle 22. In some embodiments, the powered vehicle 22 may include but not be limited to autonomous, partially autonomous, self-driving, driverless, or driver-assisted carts or related ground vehicles that is controlled by a trailer assignment and prioritization system (TAPS) 680. Although a loading dock is described, other receiving locations such as bays, stations, doors, terminals, and so on may equally apply so long as it is a location where goods, cargo, or the like can be loaded onto or unloaded from a trailer 20A-20N, where N is an integer greater than 1 (generally, 20).

A contract processor 602 generates electronic documents and/or paper documents such as but not limited to sales contracts, charter party agreements, purchase orders, bills of lading, letters of credit and others related with the trailer 20 and the cargo. Although a location of origin 604 and destination location 610 are shown, a number of intervening locations and parties may extend along the transportation chain between the location of origin 604 and destination location 610. Accordingly, documents produced by the contract processor 602 may be exchanged along a long chain of parties since their importance remains high for various payments to be effected as well as the carriage and delivery of the cargo to take place. For example, a bill of lading may initiate at the location of origin 604 and pass through several banks until they reach the receiver, and subsequently processed when the corresponding cargo is unloaded from the trailer 20 at the distribution center 610 or the like. As described herein, a distributed ledger system 620 permits such documents to be updated and/or accessible to authorized parties along at least the transportation chain between the location of origin 604 and destination location 610, but not limited thereto. For example, the transportation chain may extend to shipping ports, originating distribution centers, manufacturing facilities, and so on prior to the location of origin 604. These prior locations are not described herein for brevity. Some or all of the distributed ledger system 620 can be implemented in a cloud-computing environment, but not limited thereto.

In addition, the distributed ledger system 620 can record and process the timestamps of events relevant to the determination and validity of demurrage charges. A smart contract establishing the demurrage terms is housed on a blockchain, so that is accessible between nodes in the network. Any information recorded on the blockchain are immutable and can be shared with relevant users. The nodes record relevant information on the blockchain, such as the timestamp along the transportation chain, along with the state of the cargo and/or trailer 20. Having shared access to such timestamps, and running a consensus mechanism to verify their validity, would reduce the scope for disputes on the calculation of demurrage or event-related entries.

At one such node regarding the destination 610, a blockchain database 615 stores data regarding a private permissioned blockchain instance. This data may be unique to a particular trailer 20 and may be output via the machine-readable tag 23, e.g., radio frequency identification (RFID), Universal Product Code (UPC) or other barcode, QR code or the like for conveying relevant data when a compatible tag reader 24 receives the data.

Figure 9:
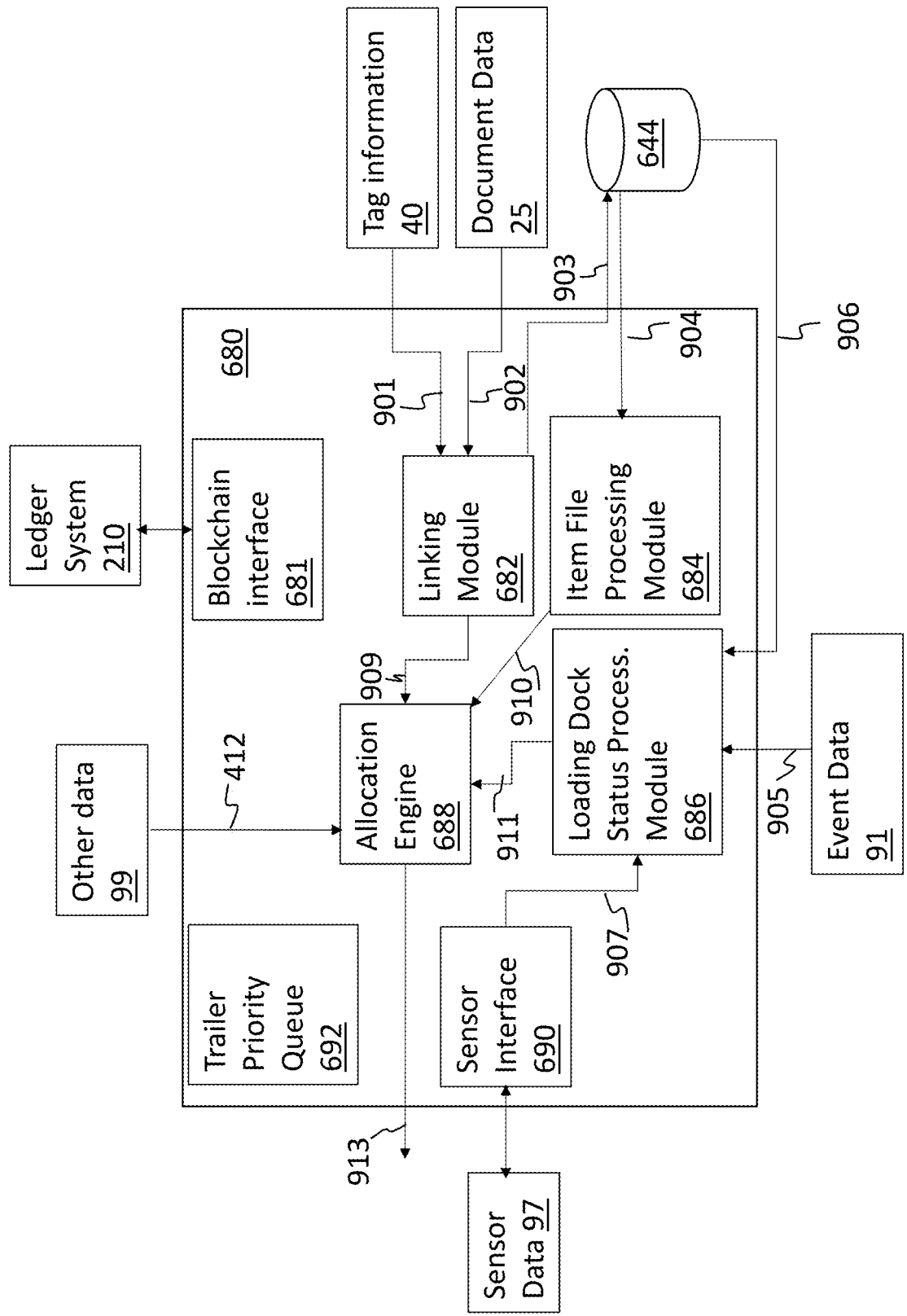
FIG. 9 is a block diagram of the trailer assignment and prioritization system of FIGS. 6-8 in communication with a distributed ledger system, in accordance with some embodiments.

The tag 23 may include active or passive technology. For example, the tag 23 may include a microchip and small antenna that emits a radio frequency signal that is picked up and read by a wireless RFID reader 24, conveying information from the tag 23 about the trailer 20 it is affixed to. In some embodiments, the machine-readable tag 23 is encoded by a manufacturer or other original source. In some embodiments, the microchip of the tag 23 can be reprogrammed, for example, to include information pertaining to a different trailer 20 or different contents of the trailer 20. As shown in FIG. 9, the tag information 40 may include, but is not limited to, a unique carrier identification that the reader uses to identify the particular carrier, a trailer identification, and other electronically stored information that identifies the trailer 20 and/or its delivery-related data such as cargo capabilities and so on. The carrier identification and trailer identification collectively provide a unique identifier 40 can be used to retrieve such information from a database (not shown) that stores trailer-related data such as size, dimension, history, current contents, and other electronically-stored information that identifies the trailer 20 and/or its delivery-related data such as cargo capabilities and so on, which can be used by the system 680 to assign the trailer 20 to a particular loading dock 612. Trailer status data may be provided from various sensors 14 or other electronic devices regarding the trailer 20, its cargo, for example, a change in temperature in the trailer 20 that may affect the quality of produce among the cargo, or other information. The trailer status data may include other information that qualifies the trailer 20 for a particular loading dock 612 by a specific configuration information, for example, a door height of the trailer that aligns with the loading dock. In some embodiments, the trailer status data may be located at a database or the like instead of or in addition to the tag 23, which can be accessed by the system 680 during a process that includes assigning and prioritizing trailers with respect to loading docks 612. The tag 23 may include secure data, for example, including encryption technology such as a private and public key, so that the blockchain database 615 can store encrypted blockchain data accordingly.

In some embodiments, a gate controller 32 communicates with the trailer assignment and prioritization system 680, and more specifically, automatically opens a gate 19 to the yard 17. Similarly, a loading dock controller 28 automatically opens and closes a door at the loading dock 612, or other otherwise controls an apparatus that permits a trailer 20 to approach an assigned loading dock 612 for unloading its cargo.

The trailer assignment and prioritization system 680 is configured to execute operations related to an assignment of one of a trailer 20 and a loading dock 612 to the other of the trailer 20 and loading dock 612, and more specifically manages the utilization of the loading docks 612 by the trailers 20 by ranking a plurality of trailers 20 to determine the order in which the trailers 20 can be received at a predetermined loading dock 612. The trailer assignment and prioritization system 680 can achieve the foregoing by facilitating the storage and processing of the trailer ID and contents, PO number, bill of lading information and/or other transaction data stored at a blockchain, or more specifically, a node of a blockchain-based electronic transfer network. In some embodiments, a node of the distributed ledger system 620 (see FIG. 2) includes electronic data storage, a network interface such as a transceiver, and a processing system coupled to the electronic data storage and the transceiver. The electronic data storage is constructed and arranged to store a transaction database in the form of the blockchain. Accordingly, details regarding a particular shipment of cargo in a predetermined trailer, while unique and specific, can be adapted by the blockchain network, which in turn can be made available to an authorized interested party.

The yard 17 may be monitored by a plurality of electronic sensors 14 arranged in the yard 17 and/or distribution center at the destination center 610 for collecting data that is received and processed by the trailer assignment and prioritization system 680 to perform operations related to an assignment of one of a trailer 20 and a loading dock 612 to the other of the trailer 20 and loading dock 612 by exchanging the collected data with the distributed ledger system 620. In doing so, all participants in a shipment can enter data regarding the shipment to a blockchain, and can view real-time blockchain updates as they occur, which can be processed as event data to adjust trailer delivery schedules, allocation of available loading docks 612 for unloading cargo, or related operations.

The sensors 14 can provide information about a particular trailer 20, for example, trailer size, to establish whether it is capable of unloading cargo at a particular loading dock 612. The sensors 14 can also collect data regarding events that may affect the availability of a trailer 20 at a predetermined loading dock 612, weather conditions, trailers blocking other trailers to prevent the other trailers from approaching a loading dock, and so on. Other sensors, transducers, and/or other electrical or electro-mechanical devices may be arranged for monitoring the loading docks 612 to collect data regarding events at or near the loading docks, which in turn can exchange data signals with other elements of the environment via network 16. For example, a sensor at the distribution center 610 can scan pallets or the like on which trailer cargo is loaded or unloaded to validate whether items among the cargo that they include the goods of interest are correctly identified on a bill of lading, cargo manifest, purchase order, or related document linked with the trailer identification encoded in a tag 23, label, or other physical object that has machine-readable indicia thereon or therein. Also, sensors 12 at the distribution center 610 can confirm whether a trailer 20 is at the correct loading dock 612. In some embodiments, an RFID reader (not shown) is present to verify that the correct trailer has been placed at the correct dock door prior to unloading in order to scan the contents of the trailer 20 as they are removed from trailer and correlate the scan results with the electronic bill of lading and/or the trailer authentication data such as an identification collected by a tag reader 24, personal computing device 26, and/or other sensors at the gate 19, which can be output to a blockchain of the ledger system 620 for authentication. In another example, an electronic reader at the distribution center 610 can scan pallets or the like on which trailer cargo is loaded or unloaded to validate whether items among the cargo include the goods of interest are correctly identified on a purchase order or bill of lading linked with the trailer identification of a machine-readable tag 23 or the like and stored in the blockchain. In this example, the blockchain includes an arrangement of data that allows the trailer to be prioritized with respect to other trailers for access to the loading dock 612 by the trailer assignment and prioritization computer 680 determining which items on a purchase order are among the cargo in the trailer 20 and ensuring that an item listed on the purchase order and not on the trailer is not a factor for determining the priority of the trailer 20 for access to the loading dock 612.

At least one tag reader 24 for identifying trailers 20 of interest may be positioned at a common entry location such as a gate 19 or the like to the yard 17 of the distribution center 610 to read the machine-readable tag 23 on the trailer 20 or vehicle 22 moving the trailer 20. In some embodiments, the gate 19 when closed prevents the vehicle 22 and trailer 20 from entering the yard 17, and when opened in response to a control signal from the trailer assignment and prioritization system 680 permits the vehicle 22 and trailer 22 to enter the yard 17. The tag reader(s) 24 is constructed and arranged at the gate 19 to read a machine-readable tag 23, such as a radio frequency identification (RFID) tag or the like. The tag 23 may be located on the trailer 20 and/or vehicle 22 attempting to enter the yard 17 via the gate 19, but not limited thereto so long as the tag 23 can be associated with the trailer 20.

Another function of the trailer assignment and prioritization system 680 may be to generate and output a signal to open and close the gate 19, the loading docks 612, and/or other apparatuses participating in the controlled allocation of resources such as available loading docks 612 for the trailers 20 currently in the yard 17 and/or attempting to enter the yard 17 via the gate 19. For example, the trailer assignment and prioritization system 680 can output via the network 16 a command to a loading dock controller 28 that in response automatically opens a door to an interior of the facility 610 at loading dock 612A when loading dock 612A is selected for unloading the contents of trailer 20A, or the gate controller 32 that in response automatically opens a gate 19, or a loading dock controller 28 that in response opens a door when the trailer's machine-readable tag 23 is electronically read by the tag reader 24 for identifying and ranking the trailer 20.

In some embodiments, the trailer assignment and prioritization system 680 communicates with the distributed ledger system 620 to receive item file information regarding the items in a trailer 20 identified by its tag 23. In some embodiments, a store database (not shown), for example, including point of sale data, item information, and so on, is part of or otherwise exchanges data with the distributed ledger system 620. For example, the distributed ledger system 620 may include shipment delivery information regarding the trailer 20, for example, a delivery schedule. The delivery schedule may be used to determine whether the trailer 20 is in compliance with a predetermined delivery date, and further used to establish a ranking for the trailer 20 with respect to other trailers 20 in the yard 17 for a next available loading dock 612. In another example, the distributed ledger system 620 may include item data regarding the known items in the trailer 20. In some embodiments, the item data may be provided by an inventory system, which is part of the distributed ledger system 620. For example, the trailer 20 may deliver perishable items such as fresh vegetables. The item data may include a date by which the fresh vegetables must be stocked at the store. This data can likewise be available to authorized users via the blockchain structure of the distributed ledger system 620.

Along these lines, in some embodiments, one or more sensors 14 are constructed and arranged as Internet of Things (IoT) sensors for receiving event data used for verifying cargo, a delivery time by the trailer 20, and so on. The ledger system 620 can ensure the quality of the data recorded on the blockchain, for example, for demurrage resolution.

The environment described in FIG. 6 may also include a personal computing device 26 operated by security guard or other personnel for validating vehicles 22 when they approach the gate 19 for attempted entry to the yard 17. In some embodiments, the personal computing device 26 is present at or near the gate 17 and operated by the vehicle driver. The personal computing device 26 is constructed and arranged to receive and process data regarding the vehicle 22, associated trailer 20 to establish whether the vehicle 22 and trailer 20 should be authorized to enter the yard 17. In addition, the personal computing device 26 can provide data that is used by the trailer assignment and prioritization system 680 to assign the trailer 20 from the gate 17 to a loading dock 612. For example, a driver of the delivery vehicle 22 may present a bill of lading, cargo manifest, purchase order, or related document to a guard at the gate 19, who may use a computer 26 having a camera, scanner, or the like to electronically retrieve the document data. This data may also be processed by the distributed ledger system 620 for availability to authorized users via the blockchain structure. In other embodiments, the bill of lading or the like is retrieved by the personal computing device 26 from the distributed ledger system 620, for example, so that the guard can compare the original bill of lading stored by the ledger system 620 with current shipment documents.

Figure 7:
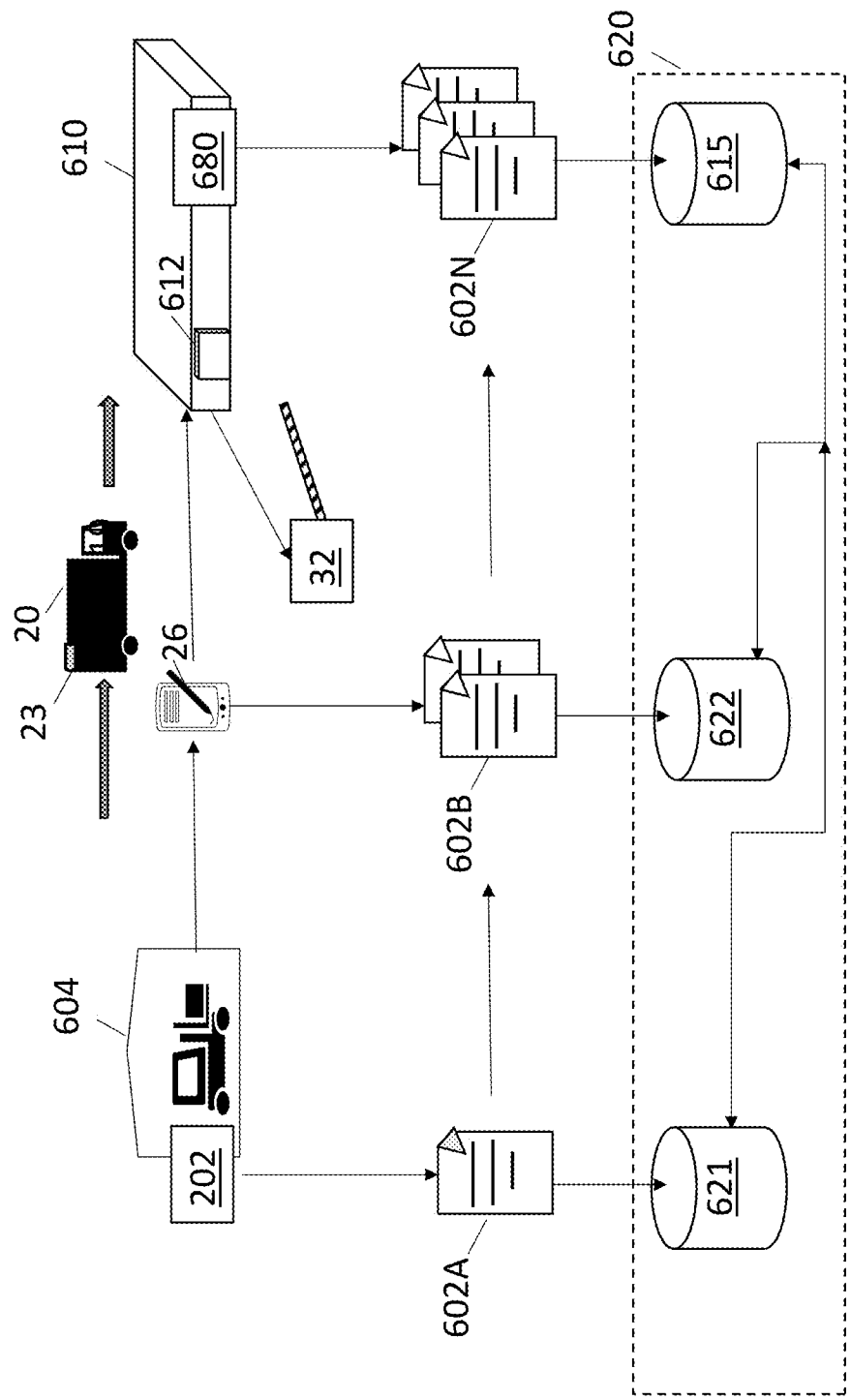
FIG. 7 is a diagram depicting the steps in an information exchange with respect to a delivery of products to a retail facility in a blockchain network, in accordance with some embodiments of the present inventive concepts.

FIG. 7 is a diagram depicting the steps in an information exchange with respect to a delivery of products to a retail facility in a blockchain network, in accordance with some embodiments of the present inventive concepts.

As described herein, a transportation chain extends from a location of origin 604 to a destination location 610. Each location in the transportation chain can include one or more computers and blockchain ledgers 602A-602N (generally, 602) for storing and rendering authorized access to data related to a load of interest on a trailer 12, transaction information, and/or other relevant information. Any of the location of origin 604, a trailer authorization location 606 (FIG. 6), e.g., at a gate 19 or guard shack or the like, and the destination location 610 can record transactions for addition to or updating the distributed ledger system 620. Accordingly, the ledger system 620 records the entire history of transactions, organized as a chain of subsequent blocks, or blockchain. In recording a transaction, the transaction can be encoded with the reference number and details of a previous transaction. For example, a transaction may include the date, time and manifest of a given load of cargo, as well as information on the carrier, which can be encoded in a single transaction and registered on the ledger system 620 comprising computers on which local ledgers at blockchain databases 615, 621, 622, respectively, are stored and executed. Thus, the transaction, or local block, can be stored on a local computer for access by an authorized party at the location. For example, a security guard at trailer authorization location 606 can use mobile computing device 26 to view all details of a transaction pertaining to a trailer 20 of interest.

In some embodiments, this transaction data is protected by security technology such as an encryption password (key') for the transaction, which must be available for the security guard to access the transaction data, which provides for full transparency to users or relevant parties in the transportation chain since the information is stored in a place where everyone can have access provided that he has the required access key. Any updates to the blockchain are likewise secured in a similar manner. Blockchain transactions can be encrypted so that it is very difficult to change a transaction's details. In addition, a blockchain transaction's encryption key is based upon the previous transaction's details. Because of this, when a transaction is decrypted to be read, if the previous transaction has been tampered with, the current transaction will not be readable. Security is preserved because false or unauthorized updates cannot be inserted without breaking the chain.

For example, at location of origin 604, an order for goods to be shipped to the destination location 610 may include information such as a certificate of origin, a purchase invoice, and a packing list, This information can be stored in a blockchain, stored at a local ledger 621, and made available to the carriers and other concerned actors along the intermodal transport chain to use for their own purpose. For example, the carrier may use the information in the blockchain to issue its bill of lading, which is appended to the blockchain and comes into force once the container has been picked up. This blockchain can be populated with additional blocks as the carrier performs his transportation service, such as the equipment used (truck and chassis), the date the container was picked up, the container identification number as well as any notable events during transportation, such as a duration of stay at a truck stop, events at a weighing station, and so on.

At the gate 17, yard 19, or intervening location, event data may be received from a tag reader 24, sensors 14, and/or other monitoring devices to automatically input event information in the blockchain such as location. For example, a plurality of electronic sensors 14 arranged in the yard 17 and/or distribution center at the destination center 610 for collecting data that is received and processed by the trailer assignment and prioritization system 680 to perform operations related to an assignment of one of a trailer 20 and a loading dock 612 to the other of the trailer 20 and loading dock 612. The sensors 14 can provide information about a particular trailer 20, for example, trailer size, to establish whether it is capable of unloading cargo at a particular loading dock 612. In doing so, the sensors 14 can collect data regarding events regarding the trailer 20 from the time the trailer 20 enters the terminal gate 19 to the time the trailer is assigned to and moves to the distribution center 610. The event data can be inputted into the blockchain, such as the equipment used to handle the container or if it was re-stacked (for yard management purposes). As mentioned above, event data along with shipping details may constitute a transaction at every interaction with a shipment. Also, smart contract data regarding the shipment can be part of a block and triggered automatically when the event according to a condition is met. For example, a payment transfer can happen automatically when a shipment reaches the destination location 610.

Referring again by way of example to FIG. 7, an authorized party may issue a bill of lading, which obligates a vehicle 22 to transport a trailer 20 with its cargo from its location of origin 604 to the predetermined destination location 610. A series of events can also be recorded such as location, status, and so on. Prior to the arrival, an authorized party can output an estimated time of arrival or related information on the blockchain, which may be retrieved by the trailer assignment and prioritization system 680 to assign trailers 20 to loading docks 612.

At the destination 610, similar operations may be performed and appended to the blockchain. Other functions to determine demurrage costs, process inspection results, determine if the shipment matches the order, and so on may be performed during which the blockchain is updated.

Figure 8:
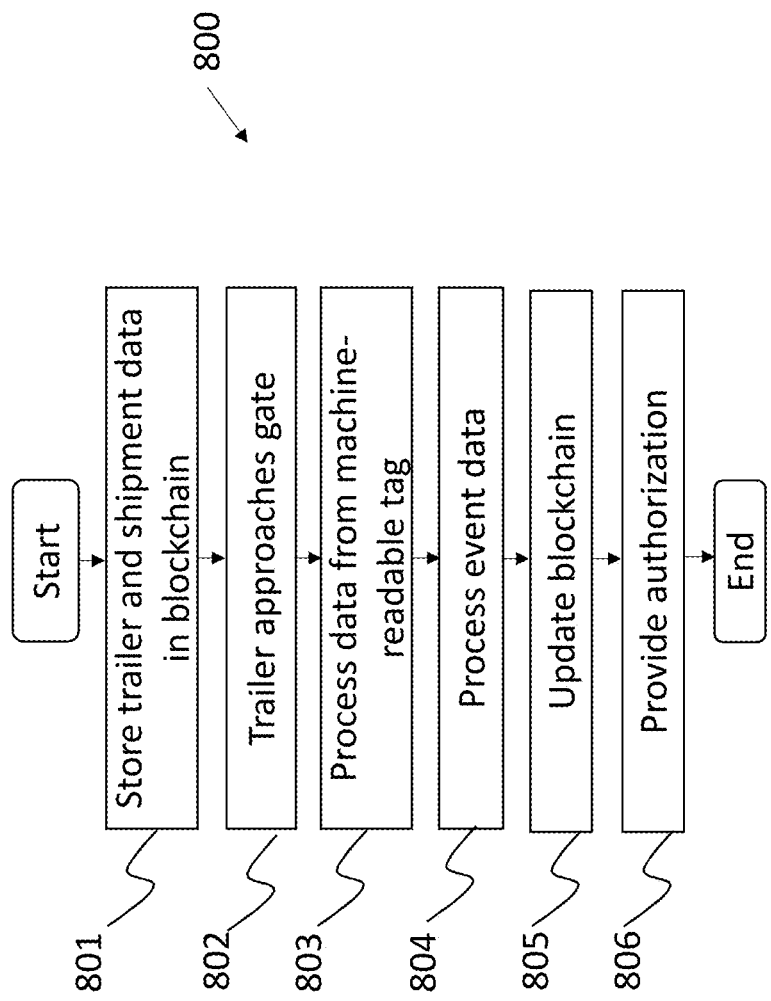
FIG. 8 is a flow diagram of a method for prioritizing trailers for a loading dock, in accordance with some embodiments.

FIG. 8 is a flow diagram of a method 800 for prioritizing trailers for a loading dock, in accordance with some embodiments. In describing the method 800, reference is made to elements of FIGS. 1-7.

At block 801, a trailer identification and related information about its cargo as well as shipment data of a purchase order, cargo manifest, bill of lading (BoL), or the like is stored as electronic data in a blockchain. The distributed ledger system 620 may store a unique blockchain for each trailer 20 in a local ledger at blockchain database 615. The blockchain can be secured by encrypting the data using a private and public key, or other security technology.

At block 802, the trailer 20 approaches a gate 19 or other location proximal a final destination 610 for security and/or authentication purposes. Here, the gate 19 or the like may prevent the trailer 20 from entering a yard 17 of a distribution center 610 or other facility unless the gate 19 is open. The gate 19 does not open unless or until the trailer 20 is approved/or assigned a loading dock 612 for unloading the trailer's contents. A plurality of trailers 20 may temporarily reside in the yard 17 as they await an assignment to a loading dock 612.

At block 803, a machine-readable tag 23 of the trailer 20 is electronically scanned, read, or otherwise retrieved by a tag reader 24, for example, an RFID reading device. For example, when the tag 23 is scanned, an antenna within the tag receives a radio wave from the reader 24 and outputs a response back to the reader 24. Information such as a trailer identification 42 can be included in the response.

At block 804, event data is received and processed by the distributed ledger system 620 and/or trailer assignment and prioritization system 680. For example, the event data may be processed to establish whether an item of the trailer 20 is required immediately by a store, and if so, the trailer assignment and prioritization system 680 can allocate or reallocate the next available loading dock 612 to the trailer 20 carrying the required item. In another example, event data output by a sensor (not shown) in the trailer 20 may establish that items in the trailer 20 are approaching an expiration date. In some embodiments, event data may be provided external to the destination location 610, yard 17, etc. For example, a shipping authority may update a local ledger at blockchain database 621 with event data establishing an immediate need to populate a retail store with an item of interest in a trailer 20 awaiting access to an available loading dock 612. Although there are several other trailers also awaiting access to the same loading dock 612, the trailer 20 of interest is automatically assigned the loading dock 612 by the trailer assignment and prioritization system 680.

At block 805, the relevant blockchain of the distributed ledger system 620 is updated with the received data.

At block 806, the trailer assignment and prioritization system 680 can output a data authorization to the gate 19, loading dock door controller, of other electronic device to perform an action in response to the blockchain data in the ledger system 620. For example, the system 680 can use blockchain data to generate a match between a trailer 20 and loading dock 612 for receiving the trailer 20. In some embodiments, the system 680 outputs a signal to the gate controller 32, which in response automatically opens the gate 19 to the yard 17 of the distribution center 610 when the trailer 20 is identified and assigned to loading dock 612. In another example, the result may be output from the system 680 to a ground vehicle, for example, an AGV that in response automatically moves to the trailer 20, connects to the trailer 20, and moves the trailer 20 to the specified loading dock 612. In another example, the system 680 may output a signal to a door of the loading dock 612, which in response automatically opens as the trailer 20 approaches the loading dock 612. In some embodiments, the system 680 can output a notification of the assignment to an electronic device, for example, a display of a user's smartphone 26, or output a signal to a security system at the distribution center 610 that in turn opens a door, activates a light beacon, etc. that informs a vehicle operator to move the assigned trailer 20 to the available loading dock 612.

FIG. 9 is a block diagram of the trailer assignment and prioritization system 680 of FIGS. 6-8 in communication with a distributed ledger system 620, in accordance with some embodiments.

In some embodiments, the trailer assignment and prioritization system 680 includes but is not limited to a blockchain interface 681 a linking module 682, an item processing module 684, a loading dock status module 686, an allocation engine 688, a sensor interface 690, and a trailer priority queue 692. Some or all of the blockchain interface 681, linking module 682, trailer status processing module 684, loading dock status module 686, allocation engine 688, sensor interface 690, and trailer priority queue 692 may be implemented in hardware such as a special purpose computer processor, software, or a combination thereof. Some or all of these elements of the system 680 may be stored and executed at a common hardware computer platform, or at different computers in communication with each other via a network, e.g., data network 16.

The blockchain interface 681 communicates with the distributed ledger system 620. The blockchain interface 681 can update a ledger or the like at the blockchain database 615 with a combination of tag information 40, document data, 25, event data 91, sensor data 97, and/or other data 99 received by the system 680. The blockchain interface 681 can receive data from the distributed ledger system 620, which may include the local blockchain database 615 and/or other data repository, and process the received blockchain data to trigger an action, for example, generate an output described in the method 800 of FIG. 8. For example, the system 680 may output a signal to open the gate 19 when a payment transfer is received after delivery of contents of a trailer 20. The blockchain interface 681 also allows authorized users to input data to the system 680 which can be processed to establish a ranking of a trailer 20 with respect to access to a loading dock 612. Thus, the blockchain interface 681 permits transactions pertaining to a trailer delivery shipment (to be registered on the system 680.

The linking module 682 is constructed and arranged to receive data corresponding to the trailer ID of the tag 23 via data flow path 901 and document data 25 of an electronic bill of lading, cargo manifest, purchase order, or related document including relevant information about the contents of a trailer 20 of interest via data flow path 902. In some embodiments, the linking module 682 establishes a logical link in a computer between shipment information in the document data 25 and the trailer 20 carrying the shipment. For example, the linking module 682 generates or otherwise populates a pre-generated record to associate the trailer 20 with the documentation 25 in a logical structure so that the system 680 can accurately identify an appropriate trailer 20 for a loading dock 612 based on events necessitating a requirement for the contents of the trailer 20. The foregoing process is automated and includes the data records stored via data flow path 903 in the distributed ledger system 620, which may include a store database 644 or other repository. The data records can include the linked data, as distinguished from conventional manual comparisons between bill of lading and trailer identification generally performed by a guard at the gate 19 viewing comparing a bill of lading presented by the trailer operator and a posted delivery schedule.

The store database 644 can store information, e.g., item data, on goods, merchandise, and the like that are delivered by the trailers 20. The linked records permit data regarding specific items in specific trailers to be identified and retrieved via data flow path 904 by the item file processing module 684. For example, the item file processing module 684 can identify and request item data 94 on specific items by use of the trailer ID in a field of the linked records, which also identifies the items in the trailer due to the document data 25. In some embodiments, the item file processing module 684 retrieves other data such as shipment data 95 from the store database 644 for processing a delivery schedule. The delivery schedule here can be identified with a trailer 20 by the trailer ID 42 in the stored record 98.

The loading dock status-processing module 686 is constructed and arranged to receive and process event data 91 via data flow path 905, for example, which includes information regarding store-specific needs, requirements, item status, and so on in the distribution center 610 and/or retail store(s) in connection with the distribution center 610. Other data may be received and processed by the loading dock status processing module 686 such as but not limited to scheduling data 95 in the database 644 via data flow path 906, sensor data 97 from various sensors 12, 14, 24 through sensor interface 690 via data flow path 907, and so on. The sensor interface 690 may communicate with various sensors or other electronic devices to receive the sensor data 97 that may be processed to determine a status of the trailers 20 and/or loading docks 612. For example, the sensor interface 690 may receive data from a sensor 14 in the yard 17 regarding the presence of a trailer 20 allocated to a loading dock 612. The system 680 may process this data to determine that the trailer 20 is not moving.

In some embodiments, the loading dock status processing module 686 may process event data 91 that includes information regarding store inventory levels, security data, and so on. For example, the loading dock status-processing module 686 may process data regarding a power outage at the store or distribution center 610, as well as data regarding a current shortage in the store of blankets, water, or other essential emergency items. The loading dock status processing module 686 may receive from the store database 644 a data record including purchase order data regarding a request and planned delivery for blankets and water. The combination of this data can determine a status at a store regarding the need for items in view of various events.

The allocation engine 688 is constructed and arranged to receive via flow paths 909-911, respectively, processed outputs from linking module 682, item file processing module 684, and loading dock status processing module 686, respectively. The allocation engine 688 may also receive relevant data 99 via data flow path 912 from other sources, for example, a cognitive computer (not shown) that provides the data 99 to identify a match between a trailer 20 and loading dock 612 for receiving the trailer 20. For example, the allocation engine 688 can process data received from the various system components to establish a status of a particular trailer 20 that the trailer 20 is ahead of a schedule according to a combination of linked data in a record, scheduling data, and event data 91 indicating that a store in communication with the distribution center 610 has a low inventory of water and blankets and that the cargo in the trailer 20 includes the needed blankets according to vehicle computer data if a predicted blizzard occurs. In this example, other event data 91 such as weather data can be provided from a source such as a website of a weather service provider, local news repository, and so on. Additional data 99 from an artificial intelligence computer may corroborate the weather data, or provide additional weather predictions.

The allocation engine 688 outputs via flow path 913 a result of a determination by the allocation engine 688 that identifies a trailer 20 for an available loading dock 612 and/or identifies a loading dock 612 for a trailer 20 of interest, but outputting one or more signals that instruct other computers, devices, or relevant apparatuses to reallocate trailers so that trailers carrying cargo useful or popular during such natural disasters are given priority to the loading docks 612. The result may be provided as part of a data signal that is output to a remote computer via a data network 16. In another example, the result may be output from the allocation engine 688 to a ground vehicle, for example, an AGV that in response automatically moves to the trailer 20, connects to the trailer 20, and moves the trailer 20 to the specified loading dock 612. In another example, the allocation engine 688 may generate a data signal that is output to a door of the loading dock 612, which in response automatically opens as the trailer 20 approaches the loading dock 612.

In some embodiments, the sensor interface 690 controls various sensors to open trailer doors, loading dock doors, verify shipments, and other functions. Examples of sensors may include, but not be limited to the loading dock sensors 12, yard sensors 14, ID readers 24, and/or other sensors in the trailers and/or distribution center 610 or other facility for receiving contents of a trailer 20. In some embodiments, the sensor interface 690 receives event data 91 that may identify a dynamic change in an event status. For example, a natural disaster may occur when all loading docks 612 are currently occupied. Here, the event data 91 may provide a signal to the sensor interface 690, which in turn communicates with the allocation engine 688 to determine a status of availability of the loading docks 612 in view of the natural disaster.

The priority queue 692 is constructed and arranged to temporarily store a listing of trailers 20 according to priority for authorization to approach available loading docks 612 for a loading or unloading operation. In some embodiments, the priority queue 692 may be reordered in response to a change in events or other reason for a change in priority, for example, described at block 806 of method 800 in FIG. 8. For example, the system 680 can determine from a store's inventory system a current state of certain goods and determine from the delivered contents of a trailer 20 whether those contents satisfy the inventory requirement. If so, then the trailer 20 may be moved up in a priority queue 692 whereby the trailer 20 is next in line for an available loading dock 612.

As described above, trailers may be prioritized in view of MABD regulations, whereby suppliers are required to deliver ordered products to a designated store or distribution center by a pre-agreed date or pay a penalty fee for non-compliance with the agree-upon delivery date. However, MABD regulations are static and do not consider unanticipated factors with unloading trailers at a planned delivery location such as dock door shortages or the like. This problem is exacerbated when trailers arrive directly at available loading docks on a first-in first-out (FIFO) basis and without consideration for events or other dynamic factors that may affect an urgent need for unloading the trailers on a time-sensitive basis.

Figure 10:
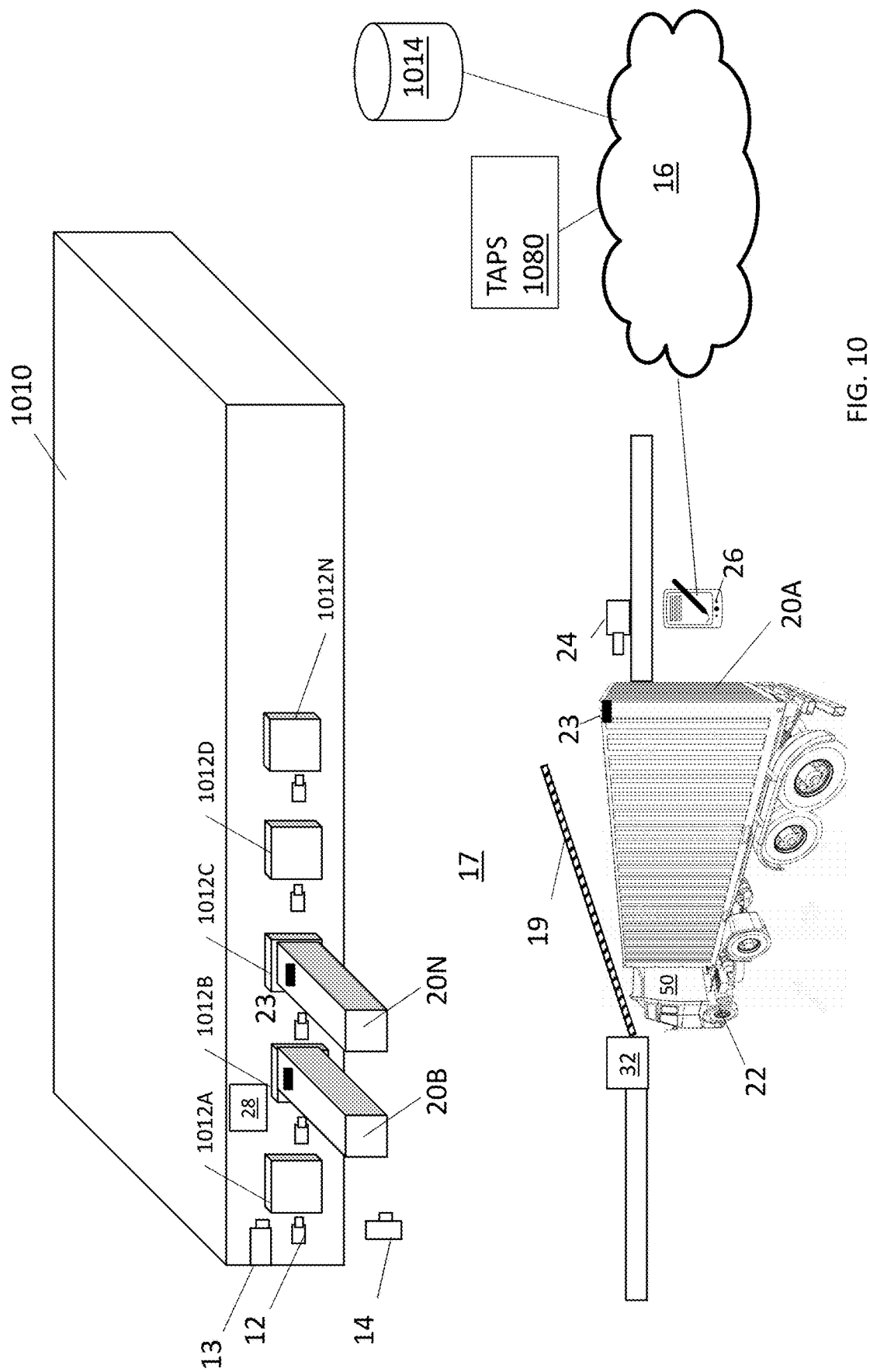
FIG. 10 is a diagram depicting an environment in which embodiments of the present inventive concepts can be practiced.

FIG. 10 is a diagram depicting an environment in which embodiments of the present inventive concepts can be practiced. As shown in FIG. 10, a receiving facility such as a distribution center 1010 has a plurality of loading docks 1012A-1012N (where N is an integer greater than 1; generally, 1012). Although a distribution center 1010 is described, warehouses, other storage facilities, buildings, or the like for receiving cargo such as retail goods from a delivery vehicle may equally apply. The loading docks 1012 may include bays, stations, doors, terminals, and so on, provide a location where goods, cargo, or the like can be loaded onto or unloaded from a trailer 20A-20N, where N is an integer greater than 1 (generally, 20). The trailers 20 may be part of, hitched to, or otherwise attached to a powered vehicle 22 such as a car, tractor, truck, cart, train, and so on. In some embodiments, the trailers 20 may be pushed, towed or otherwise moved to an assigned loading dock 1012 by the powered vehicle 22. In some embodiments, the powered vehicle 22 may include but not be limited to autonomous, partially autonomous, self-driving, driverless, or driver-assisted carts or related ground vehicles controlled by a trailer assignment and prioritization system (TAPS) 1080.

A yard 17 or parking lot or other location at where the trailers 20 are queued can accommodate some or all vehicles 22 and associated trailers 20 waiting for access to an available loading dock 1012. The yard 17 may be monitored by a plurality of electronic sensors 14 arranged in the yard 17 for collecting data that is received and processed by the trailer assignment and prioritization system 1080 to perform operations related to an assignment of one of a trailer 20 and a loading dock 1012 to the other of the trailer 20 and loading dock 1012. The sensors 14 can collect information about a particular trailer 20, for example, trailer size, to establish whether it is capable of unloading cargo at a particular loading dock 1012. The sensors 14 can also collect data regarding events that may affect the prioritization of trailers, for example, weather conditions, trailers blocking other trailers to prevent the other trailers from approaching a loading dock, and so on. The loading docks 1012 may also be monitored by a plurality of sensors 12, which in turn can exchange data signals with other elements of the environment via network 16. The dock sensors 12 may be similar to or different from the yard sensors 14. A sensor 12 at the distribution center 1010 can scan pallets or the like on which trailer cargo is loaded or unloaded to validate whether items among the cargo that they include the goods of interest are correctly identified on a bill of lading, cargo manifest, purchase order, or related document linked with the trailer identification encoded in a tag 23, label, or other physical object that has machine-readable indicia thereon or therein.

Also, the sensors 12, 14 can confirm whether a trailer 20 is at the correct loading dock 1012. In some embodiments, an RFID reader 13 is present to verify that the correct trailer has been placed at the correct dock door prior to unloading. An RFID reader 13 at the selected loading dock 1012 may scan the contents of the trailer 20 as they are removed from trailer and correlate the scan results with the electronic bill of lading and/or the trailer authentication data collected by the reader 24 and/or personal computing device 26 at the gate 19 by the reader 24. In particular, the electronic data reader 23 at the distribution center 1010 can scan pallets or the like on which trailer cargo is loaded or unloaded to validate whether items among the cargo that they include the goods of interest are correctly identified on a purchase order or bill of lading linked with the trailer identification of a machine-readable tag 23 or the like.

At least one tag reader 24 for identifying trailers 20 of interest may be positioned at a common entry location such as a gate 19 or the like to the yard 17 of the distribution center 1010 to read the machine-readable tag 23 on the trailer 20 or vehicle 22 moving the trailer 20. In some embodiments, the gate 19 when closed prevents the vehicle 22 and trailer 20 from entering the yard 17, and when opened in response to a control signal from the trailer assignment and prioritization system 1080 permits the vehicle 22 and trailer 22 to enter the yard 17. The tag reader(s) 24 is constructed and arranged at the gate 19 to read a machine-readable tag 23, such as a radio frequency identification (RFID) tag or the like. The tag 23 may be located on the trailer 20 and/or vehicle 22 attempting to enter the yard 17 via the gate 19, but not limited thereto so long as the tag 23 can be associated with the trailer 20.

A function of the trailer assignment and prioritization system 1080 is to manage the utilization of the loading docks 1012 by the trailers 20 by ranking a plurality of trailers 20 to determine the order in which the trailers 20 can be received at a predetermined loading dock 1012. For example, the trailer assignment and prioritization system 1080 may generate and output a computer instruction to one or more of a vehicle computer 50, a store computer (not shown), a mechanical switch of the gate 19, door, or the like at an entrance to the yard 17, a personal computing device such as a smartphone, and/or other electronic devices capable of identifying and controlling access to an available loading dock 1012 for a particular trailer 20, or identifying a trailer 20 for unloading its contents at a specific loading dock according to predetermined criteria.

Another function of the trailer assignment and prioritization system 1080 may be to generate and output a signal to open and close the gate 19, the loading docks 1012, and/or other apparatuses participating in the controlled allocation of resources such as available loading docks 1012 for the trailers 20 currently in the yard 17 and/or attempting to enter the yard 17 via the gate 19. For example, the trailer assignment and prioritization system 1080 can output via the network 16 a command to a loading dock controller 28 that in response automatically opens a door to an interior of the facility 1010 at loading dock 1012A when loading dock 1012A is selected for unloading the contents of trailer 20A, or a gate controller 32 that in response automatically opens a door to the gate 19 when the trailer's machine-readable tag 23 is electronically read by the tag reader 24 for identifying and ranking the trailer 20.

In some embodiments, the trailer assignment and prioritization system 1080 communicates with a store database 1014 to receive item file information regarding the items in a trailer 20 identified by its tag 23. For example, the store database 1014 may include shipment delivery information 95 regarding the trailer 20, for example, a delivery schedule. The delivery schedule may be used to determine whether the trailer 20 complies with a predetermined delivery date, and further used to establish a ranking for the trailer 20 with respect to other trailers 20 in the yard 17 for a next available loading dock 1012. In another example, the store computer database 1014 may include item data 94 regarding the known items in the trailer 20. In some embodiments, the item data 94 may be provided by an inventory system 60 that is part of the store computer database 1014. For example, the trailer 20 may deliver perishable items such as fresh vegetables. The item data 94 may include a date by which the fresh vegetables must be stocked at the store. This data 94 can likewise be used to rank the trailer 20 for prioritization with respect to a next available loading dock 1012.

The environment described in FIG. 10 may also include a personal computing device 26 operated by a security guard or other personnel for validating vehicles 22 when they approach the gate 19 for attempted entry to the yard 17. In some embodiments, the personal computing device 26 is present at or near the gate 17 and operated by the vehicle driver. The personal computing device 26 is constructed and arranged to receive and process data regarding the vehicle 22, associated trailer 20, in order to establish whether the vehicle 22 and trailer 20 should be authorized to enter the yard 17. In addition, the personal computing device 26 can provide data that is used by the trailer assignment and prioritization system 1080 to assign the trailer 20 from the gate 17 to a particular loading dock 1012. For example, the personal computing device 26 may include a scanning device to scan a purchase order, bill of lading, or the like to retrieve its contents for processing by the trailer assignment and prioritization system 1080, for example, to assign a loading dock 1012 according to the contents, in particular, document data 25 of the purchase order, bill of lading, or the like, also referred to as shipment data. In other embodiments, the bill of lading or the like is stored electronically at the personal computing device 26.

Figure 11:
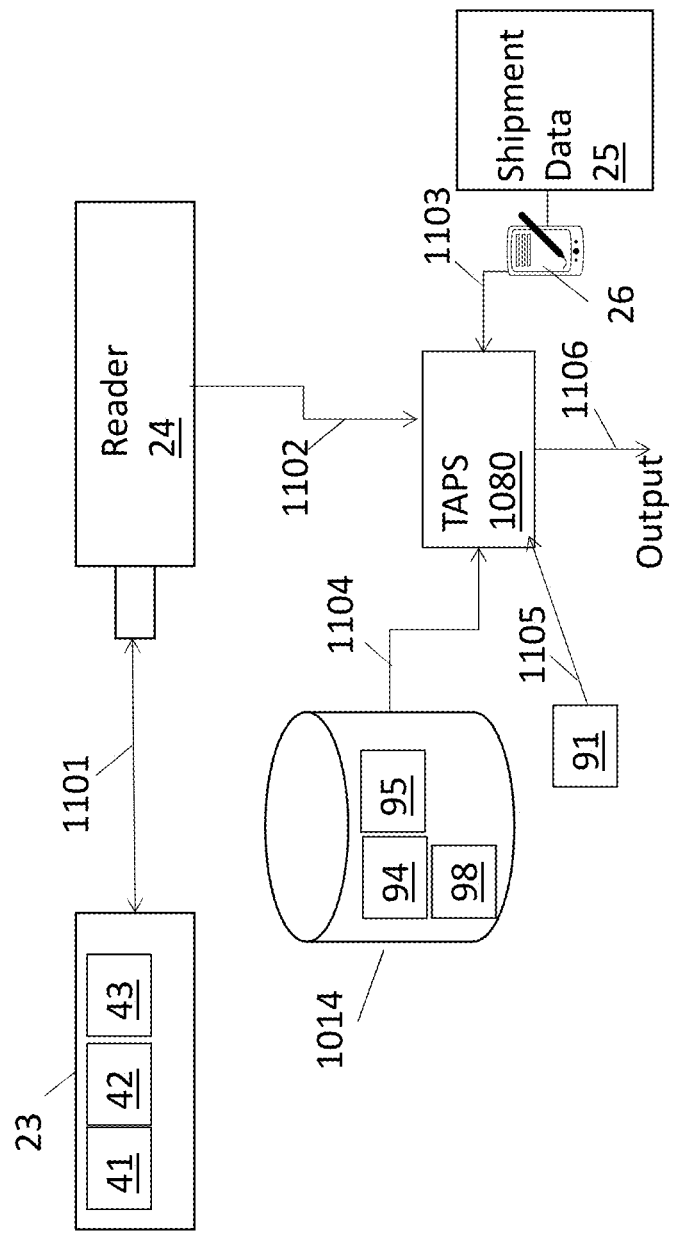
FIG. 11 is a block diagram illustrating data flow paths between elements of the trailer assignment and prioritization system of FIG. 10, in accordance with some embodiments.

FIG. 11 is a block diagram illustrating data flow paths between elements of the trailer assignment and prioritization system of FIG. 10, in accordance with some embodiments.

As shown in FIG. 11, the tag reader 24 may scan or otherwise receive a machine-readable tag 23 in order to receive data via flow path 1101 from the tag 23 relevant for prioritizing the trailer 20 corresponding to the tag 23. The machine-readable tag 23 can be a radio frequency identification (RFID), universal product code (UPC) or other barcode, QR code or the like for conveying relevant data when a compatible tag reader 24 receives the data. The tag reader 24 in turn outputs the tag data received from the tag 23 to the trailer assignment and prioritization system 1080 via data flow path 1102.

The tag 23 may include active or passive technology. For example, the tag 23 may include a microchip and small antenna that emits a radio frequency signal that is picked up and read by a wireless RFID reader 24, conveying information from the tag 23 about the trailer 20 it is affixed to. In some embodiments, the machine-readable tag 23 is encoded by a manufacturer or other original source. In some embodiments, the microchip of the tag 23 can be reprogrammed, for example, to include information pertaining to a different trailer 20 or different contents of the trailer 20. The tag information may include, but is not limited to, a unique carrier identification 41 that the reader uses to identify the particular carrier, a trailer identification 42, and other electronically stored information that identifies the trailer 20 and/or its delivery-related data such as cargo capabilities and so on. The carrier identification 41 and trailer identification 42 collectively provide a unique identifier can be used to retrieve such information from a database (not shown) that stores trailer-related data such as size, dimension, history, current contents, and so on, which can be used by the system 1080 to assign the trailer 20 to a loading dock 1012. In some embodiments, the tag information may include trailer status data 43, which may be useful with respect to the system 1080 identifying the corresponding trailer 20 as a candidate for a particular loading dock 1012. The trailer status data 43 may be provided from various sensors or other electronic devices regarding the trailer 20, its cargo, for example, a change in temperature in the trailer 20 that may impact the quality of produce among the cargo, or other information. The trailer status data 43 may include other information that qualifies the trailer 20 for a particular loading dock 1012 by a specific configuration information, for example, a door height of the trailer that aligns with the loading dock. In some embodiments, the trailer status data 43 may be located at a database or the like instead of or in addition to the tag 23, which can be accessed by the system 1080 during a process that includes assigning and prioritizing trailers with respect to loading docks 1012.

The guard computer 26 receives information on the goods carried in the trailer 20. For example, the delivery driver may present a bill of lading, cargo manifest, purchase order, or related document to a guard at the gate 19, who may use a computer 26 having a camera, scanner, or the like to electronically retrieve the document data 25. Alternatively, the document data 25 may be stored electronically on a vehicle computer or driver's smartphone or other computer and exchanged electronically with the guard computer 26. The document data 25 may include type, quantity, destination of goods being carried, physical cargo details such as weight and size, and on. The guard computer 26 in turn outputs the document data 25 to the trailer assignment and prioritization system 1080 via data flow path 1103.

The trailer assignment and prioritization system 1080 may communicate with the store database 1014 to retrieve item data 94 and scheduling data 95, but not limited thereto, via data flow path 1104. Such content of the store database 1014 can be processed by the trailer assignment and prioritization system 1080 with the linked tag and document data to generating a ranking for the trailer 20.

The trailer assignment and prioritization system 1080 may receive event data 91 via data flow path 1105 to identify an event where a store is in need for particular goods in a trailer 20, or according to a status of items in the distribution center 1010 and/or retail store. For example, the event data 91 may be provided by an inventory system that reveals that a retail store has a low supply of fresh vegetables and is in immediate need for the vegetables among the cargo of the trailer 20 at the gate 19 awaiting entry to the yard 17 (see FIG. 10). In another embodiment, the event data 91 may be provided by a data repository such as store database 1014 that stores calendar information indicating time periods, dates, etc. when high customer demand is anticipated, such as the day after Thanksgiving ("Black Friday"), which can be used to identify trailers 20 carrying that item of interest and prioritize the trailers 20 accordingly. Other event data 91 may be received from various data sources that indicate a power outage at a store, a modification such as a change from Halloween to Christmas at a store, an unexpected and urgent need for a particular item, low inventory levels of particular items, the impact of demurrage due to a delayed shipment, and so on. This data may include a timestamp including the time, date, and conditions when the power outage occurred. This data can be used to compare to contents of various trailers 20 in the yard 17 and/or anticipated as arriving at the yard 17. For example, a trailer 20 may be determined to include power generators, which may be useful during power outages. This data is relevant if a power outage indeed occurs due to an expectation of a demand for the power generators.

Other event data 91 may be provided by sensors, monitors, and so on, for example, sensors 12 at the distribution center 1010 and/or sensors 14 at the yard 17 that dynamically monitor an environment at the store, the loading dock 1012, distribution center 1010, yard 17, and/or data provided by elements of the trailer assignment and prioritization system 1080 to determine whether conditions have changed warrant a reassignment in priority with respect to a particular trailer 20.

The trailer assignment and prioritization system 1080 processes the data received from 1102-1105, respectively, to generate a match between a trailer 20 and loading dock 1012 for receiving the trailer 20. The allocation engine 218 outputs via flow path 1106 a result of a determination by the system 1080 that identifies a trailer 20 for an available loading dock 1012 and/or identifies a loading dock 1012 for a trailer 20 of interest. The result may be provided as part of a data signal that is output to a remote computer via a data network 16. In some embodiments, the system 1080 outputs a signal to the gate controller 32, which in response automatically opens the gate 19 to the yard 17 of the distribution center 1010 when the trailer 20 is identified and assigned to particular loading dock 1012. In another example, the result may be output from the system 1080 to a ground vehicle, for example, an AGV that in response automatically moves to the trailer 20, connects to the trailer 20, and moves the trailer 20 to the specified loading dock 1012. In another example, the system 1080 may output a signal to a door of the loading dock 1012, which in response automatically opens as the trailer 20 approaches the loading dock 1012.

Figure 12:
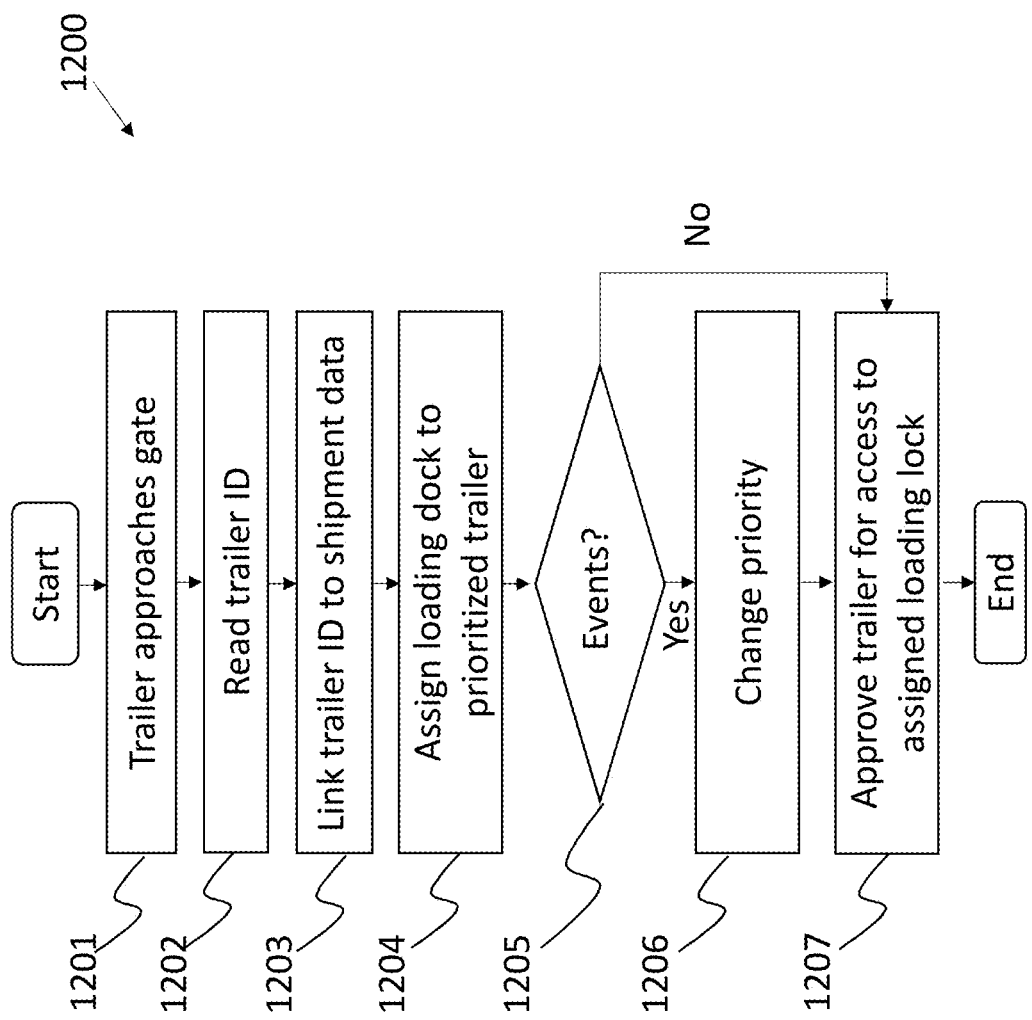
FIG. 12 is a flow diagram of a method for prioritizing trailers for a loading dock, in accordance with some embodiments.

FIG. 12 is a flow diagram of a method 1200 for prioritizing trailers for a loading dock, in accordance with some embodiments. In describing the method 1200, reference is made to elements of FIGS. 10 and 11. Although the method 1200 pertains to the prioritization of trailers 20, other embodiments may equally apply, and can include the prioritization of other storage or delivery vehicles.

At block 1201, a trailer 20 approaches a gate 19 that prevents the trailer 20 from entering a yard 17 of a distribution center 1010 or other facility unless the gate 19 is open. A plurality of trailers 20 may temporarily reside in the yard 17 as they await an assignment to a loading dock 1012.

At block 1202, a machine-readable tag 23 of the trailer 20 is electronically scanned, read, or otherwise retrieved by a tag reader 24, for example, an RFID scanning device. For example, when the tag 23 is scanned, an antenna within the tag receives a radio wave from the reader 24 and outputs a response back to the reader 24.

Information such as a trailer identification 42 can be included in the response. Accordingly, at block 1203, the trailer identification 42 of the tag 23 is linked by the trailer assignment and prioritization system 1080 to document data 25 of a bill of lading or the like. For example, the trailer identification 42 is "linked" to a bill of lading when the trailer is ready to be shipped from the supplier, the supplier electronically updates a delivery identification and bill of lading with the carrier identification 41 and trailer identification 42. The delivery identification links the purchase orders to the trailer identification 42. In some embodiments, the delivery identification is included in the scheduling data 95. Therefore, when a shipper creates a schedule, a scheduling data record is generated in stored in the database 1014. Additional data such as the carrier identification 41 and trailer identification 42 may be included and verified at the receiving facility 1010.

At block 1204, a trailer 104 is assigned by the trailer assignment and prioritization system 1080 to the trailer 20 based at least in part to the linked trailer identification 42 and document data 25 and item data 94. For example, the trailer 20 having a tag 23 scanned by a reader 24 may carry snowblowers which are of high priority to the store and therefore be moved to the top of a priority queue 1322 (see FIG. 13) of the trailer assignment and prioritization system 1080. Subsequently, the trailer 20 carrying the snowblowers may receive an authorization to arrive at a particular loading dock 1012 for expedited unloading.

At decision diamond 1205, a determination is made whether an event such as a status of an item of the trailer 20 is such that the trailer assignment at block 1204 requires a modification. For example, event data 91 output in FIG. 11 may be provided by a sensor (not shown) in the trailer 20 that items in the trailer 20 are approaching an expiration date. In another example, event data 91 may establish that the store has run out of water and blankets due to a recent snowstorm. If such an event is detected, then the method proceeds to block 1206, where the trailer's priority will be increased in a trailer priority queue 1322 (see FIG. 13), which in turn can output a data signal so that the trailer 20 is identified as a higher priority trailer 20. Here, the arrangement and listing of trailers 20 in the priority queue 1322 may be reordered. The method 1200 then proceeds to block 1207 where the trailer 20 is approved for access to the assigned loading dock 1012. Otherwise, if at decision diamond 1205 a determination is made by the system 1080 that no event is present, then the method 1200 proceeds directly to block 1207.

Accordingly, method 1200 provides for an appropriate available loading dock 1012 assigned to the prioritized trailer 20 in response to a determination of compatibility between trailer 20 and loading dock 1012. The system 1080 can output a notification of the assignment, for example, output via flow path 1106 of FIG. 11, to an electronic device, for example, a display of a user's smartphone, or output a signal to a security system at the distribution center 1010 that in turn opens a door, activates a light beacon, etc. that informs a vehicle operator to move the assigned trailer 20 to the available loading dock 1012.

Figure 13:
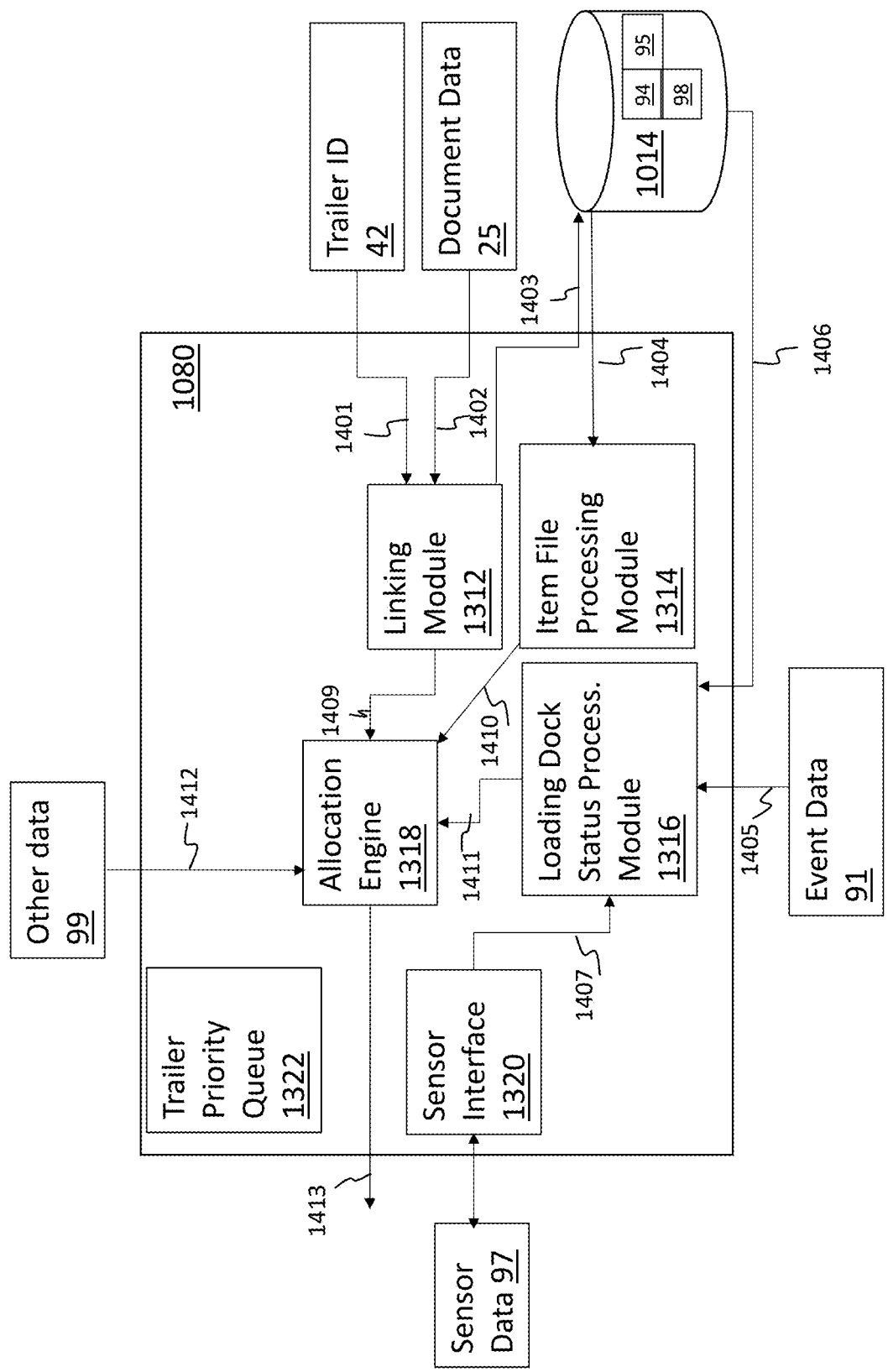
FIG. 13 is a block diagram illustrating data flow paths between elements of the trailer assignment and prioritization system of FIGS. 10-12, in accordance with some embodiments.

FIG. 13 is a block diagram illustrating data flow paths between elements of the trailer assignment and prioritization system 1080 of FIGS. 10-12, in accordance with some embodiments.

In some embodiments, the system 1080 includes but is not limited to a linking module 1312, a trailer status processing module 1314, a loading dock status module 1316, an allocation engine 1318, a sensor interface 1320, and a trailer priority queue 1322. Some or the entire linking module 1312, trailer status-processing module 1314, loading dock status module 1316, allocation engine 1318, sensor interface 1320, and trailer priority queue 1322 may be implemented in hardware such as a special purpose computer processor, software, or a combination thereof. Some or all of these elements of the system 1080 may be stored and executed at a common hardware computer platform, or at different computers in communication with each other via a network, e.g., data network 16 of FIG. 10.

The linking module 1312 is constructed and arranged to receive data corresponding to the trailer ID of the tag 23 via data flow path 1401 and the document data 25 of an electronic bill of lading, cargo manifest, purchase order, or related document including relevant information about the contents of a trailer 20 of interest via data flow path 1402. In some embodiments, the linking module 1312 establishes a logical link in a computer between shipment information in the document data 25 and the trailer 20 carrying the shipment. For example, the linking module 1312 generates or otherwise populates a pre-generated record 98 to associate the trailer 20 with the documentation 25 in a logical structure so that the system 1080 can accurately identify an appropriate trailer 20 for a loading dock 1012 based on events necessitating a requirement for the contents of the trailer 20. The foregoing process is automated and includes the data records 98 stored via data flow path 1403 in the store database 1014 or other repository. The data records 98 include the linked data, as distinguished from conventional manual comparisons between bill of lading and trailer identification generally performed by a guard at the gate 19 viewing or otherwise comparing a bill of lading presented by the trailer operator and a posted delivery schedule.

As previously described, the store database 1014 can store information, e.g., item data 94, on goods, merchandise, and the like that are delivered by the trailers 20. The linked records permit data regarding specific items in specific trailers to be identified and retrieved via data flow path 1404 by the item file processing module 1314. For example, the item file processing module 1314 can identify and request item data 94 on specific items by use of the trailer ID in a field of the linked records, which also identifies the items in the trailer due to the document data 25. In some embodiments, the item file processing module 1314 retrieves other data such as shipment data 95 from the store database 1014 for processing a delivery schedule. The delivery schedule here can be identified with a particular trailer 20 by the trailer ID 42 in the stored record 98.

The loading dock status processing module 1316 is constructed and arranged to receive and process event data 91 via data flow path 1405, for example, which includes information regarding store-specific needs, requirements, item status, and so on in the distribution center 1010 and/or retail store(s) in connection with the distribution center 1010. Other data may be received and processed by the loading dock status processing module 1316 such as but not limited to scheduling data 95 in the database 1014 via data flow path 1406, sensor data 97 from various sensors 12, 14, 24 through sensor interface 1320 via data flow path 1407, and so on. The sensor interface 1320 may communicate with various sensors or other electronic devices to receive the sensor data 97 that may be processed to determine a status of the trailers 20 and/or loading docks 1012. For example, the sensor interface 1320 may receive data from a sensor 14 in the yard 17 regarding the presence of a trailer 20 allocated to a loading dock 1012. The system 1080 may process this data to determine that the trailer 20 is not moving.

In some embodiments, the loading dock status processing module 1316 may process event data 91 that includes information regarding store inventory levels, security data, and so on. For example, the loading dock status processing module 1316 may process data regarding a power outage at the store or distribution center 1010, as well as data regarding a current shortage in the store of blankets, water, or other essential emergency items. The loading dock status-processing module 1316 may receive from the store database 1014 a data record including purchase order data regarding a request and planned delivery for blankets and water. The combination of this data can determine a status at a store regarding the need for particular items in view of various events.

The allocation engine 1318 is constructed and arranged to receive via flow paths 1409-1411, respectively, processed outputs from linking module 1312, item file processing module 1314, and loading dock status processing module 1316, respectively. The allocation engine 1318 may also receive relevant data 99 via data flow path 1412 from other sources, for example, a cognitive computer (not shown) that provides the data 99 to identify a match between a trailer 20 and loading dock 1012 for receiving the trailer 20. For example, the allocation engine 1318 can process data received from the various system components to establish a status of a particular trailer 20 that the trailer 20 is ahead of a schedule according to a combination of linked data in a record 98 scheduling data 95, and event data 91 indicating that a store in communication with the distribution center 1010 has a low inventory of water and blankets and that the cargo in the trailer 20 includes the needed blankets according to vehicle computer data 96 if a predicted blizzard occurs. In this example, other event data 91 such as weather data can be provided from a source such as a website of a weather service provider, local news repository, and so on. Additional data 99 from an artificial intelligence computer may corroborate the weather data, or provide additional weather predictions.

The allocation engine 1318 outputs via flow path 1413 a result of a determination by the allocation engine 1318 that identifies a trailer 20 for an available loading dock 1012 and/or identifies a loading dock 1012 for a trailer 20 of interest, but outputting one or more signals that instruct other computers, devices, or relevant apparatuses to reallocate trailers so that trailers carrying cargo useful or popular during such natural disasters are given priority to the loading docks 1012. The result may be provided as part of a data signal that is output to a remote computer via a data network 16. In another example, the result may be output from the allocation engine 1318 to a ground vehicle, for example, an AGV that in response automatically moves to the trailer 20, connects to the trailer 20, and moves the trailer 20 to the specified loading dock 1012. In another example, the allocation engine 1318 may generate a data signal that is output to a door of the loading dock 1012, which in response automatically opens as the trailer 20 approaches the loading dock 1012.

In some embodiments, the sensor interface 1320 controls various sensors to open trailer doors, loading dock doors, verify shipments, and other functions. Examples of sensors may include, but not be limited to the loading dock sensors 12, yard sensors 14, ID readers 24, and/or other sensors in the trailers and/or distribution center 1010 or other facility for receiving contents of a trailer 20. In some embodiments, the sensor interface 1320 receives event data 91 that may identify a dynamic change in an event status. For example, a natural disaster may occur when all loading docks 1012 are currently occupied. Here, the event data 91 may provide a signal to the sensor interface 1320, which in turn communicates with the allocation engine 1318 to determine a status of availability of the loading docks 1012 in view of the natural disaster.

As previously described, the priority queue 1322 is constructed and arranged to temporarily store a listing of trailers 20 according to priority for authorization to approach available loading docks 1012 for a loading or unloading operation. In some embodiments, the priority queue 1322 may be reordered in response to a change in events or other reason for a change in priority, for example, described at block 1206 of method 1200 in FIG. 12. For example, the system 1080 can determine from a store's inventory system a current state of certain goods and determine from the delivered contents of a trailer 20 whether those contents satisfy the inventory requirement. If so, then the trailer 20 may be moved up, or electronically incremented, in a priority queue 1322 whereby the trailer 20 is next in line for an available loading dock 1012.

As previously described, a computer system described with reference to the figures herein may generally comprise a processor, an input device coupled to the processor, an output device coupled to the processor, and memory devices each coupled to the processor. The processor may perform computations and control the functions of the system, including executing instructions included in computer code for the tools and programs capable of implementing methods for allocating trailers and loading docks, in accordance with some embodiments, wherein the instructions of the computer code may be executed by the processor via a memory device. The computer code may include software or program instructions that may implement one or more algorithms for implementing one or more of the foregoing methods. The processor executes the computer code.

The memory device may include input data. The input data includes any inputs required by the computer code. The output device displays output from the computer code. A memory device may be used as a computer usable storage medium (or program storage device) having a computer-readable program embodied therein and/or having other data stored therein, wherein the computer-readable program comprises the computer code. Generally, a computer program product (or, alternatively, an article of manufacture) of the computer system may comprise said computer usable storage medium (or said program storage device).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to embodiments of the inventive concepts. Thus, an embodiment of the present invention discloses a process for supporting computer infrastructure, where the process includes providing at least one support service for at least one of integrating, hosting, maintaining and deploying computer-readable code (e.g., program code) in a computer system including one or more processor(s), wherein the processor(s) carry out instructions contained in the computer code causing the computer system for generating a technique described with respect to embodiments. Another embodiment discloses a process for supporting computer infrastructure, where the process includes integrating computer-readable program code into a computer system including a processor.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A system for prioritizing a plurality of trailers delivering retail goods for an available receiving facility, the system comprising:
   a plurality of sensors configured to output sensor data; and
   a control unit configured to:
      receive the sensor data from the plurality of sensors, scheduling data, vehicle computer data, trailer data and other data regarding information about perishable items contained within a trailer of the plurality of trailers;
      identify a match between the trailer and an available loading dock based on the sensor data, the scheduling data, the vehicle computer data, the trailer data, and the other data received;
      prioritize the trailer over other trailers of the plurality of trailers based on a determination that the trailer contains perishable items and has traveled a greater distance than another trailer containing the same perishable items based on the trailer data and the other data received;
      assign the trailer to the available loading dock based on the prioritization; and
      output a control signal to at least one remote controller to control operations of at least one of an autonomous ground vehicle to manage the trailer utilization of the assigned available loading dock and a dock door of the assigned available loading dock to automatically open the dock door of the assigned available loading dock as the trailer approaches the assigned available loading dock.

2. The system of claim 1, wherein the allocation engine of the control unit further prioritizes and assigns, in real-time or near real-time, the trailer to the available loading dock in response to inventory data and store requirements for at least some of the retail goods in the trailer based on the other data received.

3. The system of claim 1, wherein the allocation engine of the control unit further prioritizes and assigns the trailer of the plurality of trailers to the available loading dock according to an initial ranking of the trailer, and wherein a sensor of the plurality of sensors collects data that establishes a compatibility between the trailer and the assigned dock door.

4. The system of claim 1, wherein the control unit comprises a store status processing module that receives and processes a combination of event data, inventory data, and store-specific requirement data to determine a current need at a store for items at the available receiving facility.

5. The system of claim 1, wherein the control unit comprises a loading dock status processing module that receives and processes a combination of the event data, scheduling data, and sensor data to determine a possible match between the available loading dock and the trailer.

6. The system of claim 1, wherein the allocation engine further generates a signal that instructs other computers, devices, or relevant apparatuses to reallocate the plurality of trailers so that at least some trailers carrying cargo relevant to the determined event are prioritized for the available loading dock.

7. The system of claim 1, wherein the control unit comprises a trailer priority queue that arranges a listing of the plurality of trailers according to a priority for trailer inventory at the available receiving facility.

8. A method for prioritizing a plurality of trailers delivering retail goods for an available receiving facility, the method comprising:

receiving, by a control unit, sensor data from a plurality of sensors, scheduling data, vehicle computer data, trailer data, and other data regarding a determined event requiring at least some of the retail goods in a trailer of a plurality of trailers;

identifying, by the control unit, a match between the trailer and an available loading dock based on at least one of the received sensor data, scheduling data, vehicle computer data, trailer data, and the other data;

prioritizing, by the control unit, the trailer over other trailers in the plurality of trailers for receipt by the available loading dock based on the determined event, wherein the determined event is the control unit determining that the trailer contains perishable items and has traveled a greater distance than another trailer containing the same perishable items based on the trailer data received;

assigning, by the control unit, the prioritized trailer from the plurality of trailers to the available loading dock; and outputting, by the control unit, a control signal to at least one remote controller to control operations of at least one of an autonomous ground vehicle to manage the trailer utilization of the assigned available loading dock and a dock door of the assigned available loading dock to automatically open the dock door as the trailer approaches the assigned available loading dock.

9. The method of claim 8, wherein prioritizing the trailer further comprises:
prioritizing, in real-time or near real-time, the trailer over the other trailers based at least in part on inventory data and store requirements for the retail goods in the trailer.

10. The method of claim 8, further comprising:
receiving a combination of event data, inventory data, and store-specific requirement data for an individual store; and
processing the received combination to determine a current need at the individual store for items at the receiving facility.

11. The method of claim 8, further comprising:
receiving a combination of scheduling data, vehicle computer data, sensor data, and trailer data; and
processing the received combination to determine a possible match between the trailer and the available loading dock.

12. The method of claim 8, further comprising:
generating another control signal that instructs other computers, devices, or relevant apparatuses to reallocate the plurality of trailers so that at least some trailers carrying cargo relevant to the determined event are prioritized for the available loading dock.

13. The method of claim 8, further comprising:
prioritizing the plurality of trailers according to a priority for the trailer inventory at the receiving facility.

14. A non-transitory computer readable medium that, upon execution by a computer, causes the computer to perform operations for prioritizing a plurality of trailers delivering retail goods for an available receiving facility, the operations comprising:

receiving, by a control unit, sensor data from a plurality of sensors, scheduling data, vehicle computer data, trailer data, and other data, the other data including information about perishable items contained within a trailer of the plurality of trailers;

identifying, by the control unit, a match between the trailer and an available loading dock based on the received sensor data;

prioritizing, by the control unit, the trailer over other trailers in the plurality of trailers for receipt by the available loading dock based on the determined event, wherein the determined event is the control unit determining that the trailer contains perishable items and has traveled a greater distance than another trailer containing the same perishable items based on the trailer data received;

assigning, by the control unit, the prioritized trailer from the plurality of trailers to the available loading dock; and outputting, by the control unit, a control signal to at least one remote controller to control operations of at least one of an autonomous ground vehicle to manage the trailer utilization of the assigned available loading dock and a dock door of the assigned available loading dock to automatically open the dock door as the trailer approaches the assigned available loading dock.

15. The non-transitory computer readable medium of claim 14, wherein the operations for prioritizing the trailer further comprise:
prioritizing, in real-time or near real-time, the trailer over the other trailers based at least in part on inventory data and store requirements for the retail goods in the trailer.

16. The non-transitory computer readable medium of claim 14, further comprising:
assigning the prioritized trailer to a dock door of the assigned available loading dock according to an initial ranking of the prioritized trailer, wherein a sensor of the plurality of sensors collects data that establishes a compatibility between the prioritized trailer and the assigned dock door.

\* \* \* \* \*